United States Patent
Gissin et al.

(10) Patent No.: US 11,636,052 B2
(45) Date of Patent: Apr. 25, 2023

(54) NON-VOLATILE MEMORY EXPRESS (NVME) DATA PROCESSING METHOD AND SYSTEM

(71) Applicant: Huawei Technologies Co., Ltd., Shenzhen (CN)

(72) Inventors: Victor Gissin, Hod Hasharon (IL); Junying Li, Shenzhen (CN); Guanfeng Zhou, Shenzhen (CN); Jiashu Lin, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/498,348

(22) Filed: Oct. 11, 2021

(65) Prior Publication Data
US 2022/0027292 A1    Jan. 27, 2022

Related U.S. Application Data

(63) Continuation of application No. 16/673,320, filed on Nov. 4, 2019, now Pat. No. 11,169,938, which is a continuation of application No. PCT/CN2018/093919, filed on Jun. 30, 2018.

(51) Int. Cl.
*G06F 13/16* (2006.01)
*G06F 9/50* (2006.01)
*G06F 13/362* (2006.01)
*G06F 13/42* (2006.01)

(52) U.S. Cl.
CPC ........ *G06F 13/1642* (2013.01); *G06F 9/5011* (2013.01); *G06F 13/1631* (2013.01); *G06F 13/3625* (2013.01); *G06F 13/4221* (2013.01)

(58) Field of Classification Search
CPC .................. G06F 13/1631; G06F 13/1642
See application file for complete search history.

(56) References Cited

U.S. PATENT DOCUMENTS

| | | | |
|---|---|---|---|
| 9,720,598 B2 | 8/2017 | Malwankar | |
| 10,101,924 B2 * | 10/2018 | Asnaashari | G06F 12/0246 |
| 10,860,511 B1 | 12/2020 | Thompson et al. | |
| 2014/0223071 A1 | 8/2014 | Bert et al. | |
| 2015/0095554 A1 | 4/2015 | Asnaashari et al. | |

(Continued)

FOREIGN PATENT DOCUMENTS

| | | |
|---|---|---|
| CN | 103970688 A | 8/2014 |
| CN | 105068953 A | 11/2015 |

(Continued)

*Primary Examiner* — David E Martinez
(74) *Attorney, Agent, or Firm* — Conley Rose, P.C.

(57) ABSTRACT

A data processing method and system, where the method includes: receiving, by a non-volatile memory express (NVMe) controller, a first Peripheral Component Interconnect express (PCIe) packet sent by a host, where a memory in the NVMe controller is provided with at least one input/output (I/O) submission queue, and the first PCIe packet includes entrance information of a target I/O submission queue and at least one submission queue entry (SQE); and storing the at least one SQE in the target I/O submission queue based on the entrance information of the target I/O submission queue. Therefore, an NVMe data processing process is simplified and less time-consuming, and data processing efficiency is improved.

23 Claims, 8 Drawing Sheets

(56) References Cited

U.S. PATENT DOCUMENTS

| | | |
|---|---|---|
| 2015/0169244 A1 | 6/2015 | Asnaashari et al. |
| 2015/0324118 A1 | 11/2015 | McCambridge et al. |
| 2016/0162189 A1 | 6/2016 | Malwankar |
| 2017/0083252 A1 | 3/2017 | Singh et al. |
| 2017/0116139 A1 | 4/2017 | McVay |
| 2017/0286363 A1 | 10/2017 | Joshua et al. |
| 2018/0239539 A1 | 8/2018 | He et al. |
| 2019/0155760 A1 | 5/2019 | Chang |

FOREIGN PATENT DOCUMENTS

| | | |
|---|---|---|
| CN | 106919531 A | 7/2017 |
| CN | 107820693 A | 3/2018 |
| EP | 3276481 A1 | 1/2018 |
| WO | 2018076793 A1 | 5/2018 |

\* cited by examiner

NON-VOLATILE MEMORY EXPRESS (NVME) DATA PROCESSING METHOD AND SYSTEM

CROSS-REFERENCE TO RELATED APPLICATIONS

This application is a continuation of U.S. patent application Ser. No. 16/673,320, filed on Nov. 4, 2019, which is a continuation of International Patent Application No. PCT/CN2018/093919, filed on Jun. 30, 2018. Both of the aforementioned applications are hereby incorporated by reference in their entireties.

TECHNICAL FIELD

This application relates to the storage field, and in particular, to a data processing method and a storage system.

BACKGROUND

With development of storage technologies, especially with continuous improvement of solid-state drive (SSD) performance in a storage device using an SSD as a storage medium, a serial advanced technology attachment (SATA) interface standard and a serial ATA advanced host controller interface/advanced host controller interface (AHCI) standard designed for a conventional hard disk drive cannot meet requirements of the SSD, becoming a bottleneck that limits an SSD processing capability. Therefore, a non-volatile memory express (NVMe) emerges. The NVMe is an interface that allows a host to communicate with a non-volatile memory (NVM) subsystem, and the interface used by the NVM subsystem (including a controller and at least one SSD) for communication is attached to a Peripheral Component Interconnect (PCI) express (PCIe) interface using a register interface, to optimize enterprise-grade solid-state storage and consumer-grade solid-state storage. This provides advantages of high performance and a low access delay.

In an NVMe data processing process, the host creates an input/output (I/O) submission queue and an I/O completion queue in a memory of the host, and an NVMe controller completes data processing based on a mechanism including a pair of an I/O submission queue and an I/O completion queue. The I/O submission queue is a ring buffer used for storing one or more data operation requests to be executed by the controller, and the I/O completion queue is a ring buffer used for storing an operation result of a data operation request completed by the controller. Each I/O submission queue corresponds to one I/O completion queue, and one I/O completion queue may correspond to a plurality of I/O submission queues. A matching relationship between an I/O completion queue and an I/O submission queue is specified by the host. An operation result of a to-be-executed data operation request in each I/O submission queue is stored in a specified I/O completion queue. The NVMe data processing process includes: when the host receives one or more to-be-executed data operation requests, the host first stores the one or more data operation requests in an I/O submission queue. Then, the host updates an I/O submission queue tail doorbell register (located in a storage area of the NVMe controller), and notifies the NVMe controller of the to-be-executed data operation requests using a doorbell. The NVMe controller obtains the to-be-executed data operation request in the I/O submission queue in a direct memory access (DMA) read manner. After processing the data operation request, the NVMe controller stores an operation result in an I/O completion queue in a DMA write manner. The I/O completion queue is an I/O completion queue that matches an I/O submission queue used by the NVMe controller to obtain a data operation request. Each time the NVMe controller stores an operation result of a data operation request in the I/O completion queue, the NVMe controller first sends an interrupt request to the host, to notify the host that the data operation request is completed. In the foregoing process, the host and the NVMe controller need to notify each other in an interrupt manner using a doorbell mechanism. Consequently, a data processing process is complex.

SUMMARY

This application provides a data processing method and a storage system, to resolve a problem that a data processing process is complex in a conventional technology.

According to a first aspect, this application provides a data processing method, and the method includes: communicating, by a non-volatile memory express (NVMe) controller, with a host using a PCIe bus; receiving, by the NVMe controller, a first PCIe packet sent by the host; and storing at least one submission queue entry (SQE) in a target I/O submission queue based on entrance information of the target I/O submission queue. A memory in the NVMe controller is provided with at least one I/O submission queue. The first PCIe packet includes the entrance information of the target I/O submission queue and the at least one SQE. One SQE corresponds to one data operation request, and each data operation request is used to perform a read or write operation on a storage medium managed by the NVMe controller.

In this application, data is stored in an I/O submission queue on a side of the NVMe controller, and the host directly sends an SQE to the NVMe controller using a PCIe packet. Therefore, this avoids a case in which the host needs to update, when sending each SQE, an I/O submission queue tail doorbell register (located in a storage area of the NVMe controller) to notify the NVMe controller of a to-be-executed data operation request, and the NVMe controller reads the SQE from an I/O submission queue of a memory in the host based on a doorbell using a PCIe. The host and the NVMe controller communicate with each other based on the entrance information of the target I/O submission queue, and the NVMe controller may store the SQE based on the entrance information of the target I/O submission queue. Therefore, a doorbell mechanism in a conventional technology can be cancelled, and a data processing process is simplified.

In a possible implementation, the entrance information of the target I/O submission queue is a unique first PCIe address in an addressable PCIe address space of the host, and a process in which the NVMe controller stores the at least one SQE in the target I/O submission queue based on the entrance information of the target I/O submission queue includes: determining a second address based on the first PCIe address, where the second address is an address at which the target I/O submission queue is stored in the memory of the NVMe controller; and storing the at least one SQE in the target I/O submission queue based on the second address.

In a possible implementation, a process in which the NVMe controller determines the second address based on the first PCIe address includes: an identifier of the target I/O submission queue is first determined based on the first PCIe address of the target I/O submission queue, and then the second address is determined based on the identifier of the target I/O submission queue.

In this application, all I/O submission queues may be marked using PCIe addresses in the addressable PCIe address space of the host. One PCIe address is allocated to each I/O submission queue, and the PCIe address is used as entrance information of the I/O submission queue. The NVMe controller may store the at least one SQE in the target I/O submission queue based on the PCIe address.

In another possible implementation, the NVMe controller calculates the identifier of the target I/O submission queue according to the following formula:

$$\text{the identifier of the target I/O submission queue} = \frac{ADD_{11} - ADD_{12}}{MCS \times 64}.$$

Herein, $ADD_{11}$ is the first PCIe address of the target I/O submission queue, $ADD_{12}$ is a start address that is of consecutive address spaces allocated from the addressable PCIe address space of the host and that is used to identify each I/O submission queue, and the MCS is a maximum quantity of coalesced SQEs in each I/O submission queue. Through calculation using the foregoing formula, the NVMe controller may determine the identifier of the target I/O submission queue and a storage location of the I/O submission queue in the memory of the NVMe controller, and further store the at least one SQE in the target I/O submission queue.

In another possible implementation, before the NVMe controller receives the first PCIe packet of the host, the NVMe controller receives a creation instruction of the host, sets the at least one I/O submission queue in the memory of the NVMe controller according to the creation instruction, and records an association relationship between an identifier of each I/O submission queue and information about an address of each I/O submission queue in the memory of the NVMe controller. According to the method in the foregoing process, the NVMe controller may create the at least one I/O submission queue according to a service requirement, to store data in the I/O submission queue.

In another possible implementation, before the NVMe controller receives the creation instruction of the host, the NVMe controller negotiates the maximum quantity of coalesced SQEs (MCS) in each I/O submission queue with the host. The MCS obtained through negotiation is a smaller value of a maximum quantity of coalesced SQEs in each I/O submission queue supported by the NVMe controller and a maximum quantity of coalesced SQEs in each I/O submission queue supported by the host. The NVMe controller and the host may determine, in an MCS negotiation manner, a maximum quantity of SQEs that can be pushed by the host each time, in other words, a maximum quantity of SQEs that can be carried in one PCIe packet. In this push manner, a quantity of packets between the host and the NVMe controller can be reduced, and data processing efficiency is improved.

In another possible implementation, before the NVMe controller receives the creation instruction of the host, the NVMe controller negotiates a maximum quantity of coalesced CQEs (MCC) in each I/O completion queue with the host. The MCC obtained through negotiation is a smaller value of a maximum quantity of coalesced CQEs in each I/O completion queue supported by the NVMe controller and a maximum quantity of coalesced CQEs in each I/O completion queue supported by the host. The NVMe controller and the host may determine, in an MCC negotiation manner, a maximum quantity of CQEs that can be pushed by the NVMe controller each time, in other words, a maximum quantity of CQEs that can be carried in one PCIe packet. In this push manner, a quantity of packets between the host and the NVMe controller can be reduced, and data processing efficiency is improved.

Optionally, a process in which the host negotiates the MCC with the NVMe controller and a process in which the host negotiates the MCS with the NVMe controller may be simultaneously performed. In other words, a negotiation request packet sent by the host includes both MCS negotiation content and MCC negotiation content. A response result returned by the NVMe controller for the negotiation request packet also includes both the MCS and the MCC that are determined by the NVMe controller. Alternatively, a process in which the host negotiates the MCC with the NVMe controller and a process in which the host negotiates the MCS with the NVMe controller may be separately performed. The MCC is determined using different negotiation request packets.

In another possible implementation, the first PCIe packet further includes depth information M of the target I/O submission queue, M indicates a quantity of SQEs carried in the first PCIe packet, and $1 \leq M \leq MCS$. The storing, by the NVMe controller, the at least one SQE in the target I/O submission queue includes: determining a preset sequence of M SQEs, and storing the M SQEs in the target I/O submission queue in the preset sequence of the M SQEs. The preset sequence of the M SQEs is a sequence in which the host receives data operation requests. According to the descriptions of the foregoing process, the NVMe controller may store the SQEs in the sequence in which the host receives data operation requests, in order to ensure that a sequence of storing SQEs in an I/O submission queue in the memory of the NVMe controller is consistent with the sequence in which the host receives data operation requests.

In another possible implementation, a memory in the host is provided with at least one I/O completion queue. The NVMe controller obtains the at least one SQE from the target I/O submission queue; performs, based on a data operation request carried in the at least one SQE, a read or write operation on a storage medium managed by the NVMe controller; and sends a second PCIe packet to the host. The second PCIe packet includes entrance information of a target I/O completion queue and at least one completion queue entry (CQE). Each CQE is an operation result of a data operation request that is carried in each SQE and that is executed by the NVMe controller. According to the descriptions of the foregoing process, the NVMe controller may also store the at least one CQE in the target I/O completion queue based on the entrance information of the target I/O completion queue. Therefore, an interrupt mechanism in a conventional technical solution is cancelled, a data processing process is simplified, and processing efficiency is improved.

In another possible implementation, when a CQE coalescing condition is met, the NVMe controller uses operation results of at least two data operation requests as payload data of the second PCIe packet. One CQE corresponds to an operation result of one data operation request. The CQE coalescing condition includes: a maximum coalesced CQE block (MCCB) size meets a first threshold, or a time recorded by an I/O completion queue coalescing timer (CQT) meets a second threshold. The NVMe controller may send a plurality of CQEs to the host in a push manner using a same PCIe packet. In other words, the NVMe controller simultaneously uses a plurality of CQEs as payload data of one PCIe packet, and sends the packet to the host. This reduces a quantity of packets between the host and the NVMe controller, and improves processing efficiency.

In another possible implementation, the second PCIe packet further includes depth information N of the target I/O completion queue, and N indicates a quantity of CQEs carried in the second PCIe packet. The NVMe controller uses N CQEs as the payload data of the second PCIe packet in a preset sequence, where 1≤N≤MCC, and where the MCC is a positive integer. The preset sequence of the N CQEs is a sequence in which the NVMe controller completes operation results generated for corresponding SQEs. It is ensured, in the second PCIe packet using the preset sequence, that a sequence in which the host stores operation results is consistent with a sequence in which the NVMe controller actually generates operation results.

In another possible implementation, the host is an embedded processor, and the embedded processor can send a PCIe packet with a capacity of at least 64 bytes.

In a possible embodiment, in addition to using a segment of consecutive first address spaces in a base address register to allocate PCIe addresses to a plurality of I/O submission queues, the host may also use several inconsecutive storage spaces in the base address register to represent all I/O submission queues. In this case, the host and the NVMe controller each record a mapping relationship between an address allocated to each I/O submission queue and an identifier of the I/O submission queue, and the host may send the first PCIe packet to the NVMe controller based on the mapping relationship. The first PCIe packet includes a PCIe address allocated by the host to the target I/O submission queue, and the PCIe address is used as the entrance information of the target I/O submission queue. Therefore, the NVMe controller may parse the first PCIe packet to obtain a PCIe address field allocated by the host to the target I/O submission queue; then determine, based on the mapping relationship, an identifier of an I/O submission queue corresponding to the PCIe address field; and store the at least one SQE of the first PCIe packet in the target I/O submission queue based on the identifier of the I/O submission queue. In this way, a process in which the NVMe controller stores the at least one SQE based on the entrance information of the target I/O submission queue is completed. In the foregoing process, a doorbell mechanism in a conventional technology can also be avoided, and a data processing process is simplified. In addition, the host may send, in a push manner, a plurality of SQEs to the NVMe controller under an SQE coalescing condition using a same PCIe packet. This reduces a quantity of message packets between the host and the NVMe controller, and improves data processing efficiency.

In another possible embodiment, the addressable PCIe address space of the host includes an address space of the memory in the host and an address space of a PCIe base address register in the host. In addition to using address in the address space of the base address register to map identifiers of all I/O submission queues in the foregoing step, addresses in the address space of the memory in the host may also be used to map the identifiers of all the I/O submission queues in this embodiment of the present application. The identifier of each I/O submission queue corresponds to a unique PCIe address. In this case, the host stores a mapping relationship between an address in the address space of the memory and an identifier of an I/O submission queue. The host may send, to the NVMe controller based on the mapping relationship, a PCIe packet that carries at least one SQE. Alternatively, the NVMe controller may determine, based on the mapping relationship and a mapping address carried in the PCIe packet, an identifier of an I/O submission queue corresponding to the mapping address, and further store the at least one SQE in the target I/O submission queue. According to the foregoing method, a doorbell mechanism in a conventional technology can also be cancelled, and a data processing process is simplified. In addition, the host sends a plurality of SQEs to the NVMe controller under the SQE coalescing condition using a same PCIe packet. This reduces a quantity of message packets between the host and the NVMe controller, and improves data processing efficiency.

In another possible embodiment, in addition to mapping an identifier of an I/O submission queue according to a PCIe protocol using an address, the host and the NVMe controller may also transmit the identifier of the target I/O submission queue to the NVMe controller based on a pre-agreement using a specified field in a PCIe packet or a part of payload data. Then the NVMe controller parses the PCIe packet to obtain the foregoing specified field (for example, a reserved field in the PCIe packet or a start bit of the payload data), and determines, based on the pre-agreement, the identifier of the I/O submission queue indicated by the specified field. Therefore, a doorbell mechanism in a conventional technology can also be cancelled, and a data processing process is simplified.

According to a second aspect, this application provides a data processing method, and the method includes: communicating, by an NVMe controller, with a host using a PCIe bus; determining, by the host, entrance information of a target I/O submission queue based on an identifier of the target I/O submission queue of a to-be-sent data operation request; and sending a first PCIe packet to the NVMe controller. A memory in the NVMe controller is provided with at least one I/O submission queue. The first PCIe packet includes the entrance information of the target I/O submission queue and at least one SQE. One SQE corresponds to one data operation request, and each data operation request is used to perform a read or write operation on a storage medium managed by the NVMe controller.

In a possible implementation, the host allocates a unique PCIe address in an addressable PCIe address space of the host to each I/O submission queue. The entrance information of the target I/O submission queue is a first PCIe address of the target I/O submission queue, and the addressable PCIe address space of the host is a storage space of a memory in the host or an address space of a PCIe base address register in the host. The host determines the first PCIe address of the target I/O submission queue based on the identifier of the target I/O submission queue.

In another possible implementation, the host sends a creation instruction to the NVMe controller. The creation instruction is used to instruct the NVMe controller to set the at least one I/O submission queue in the memory of the NVMe controller, and record an association relationship between an identifier of each I/O submission queue and a first PCIe address of each I/O submission queue.

In another possible implementation, before the host sends the creation instruction to the NVMe controller, the host negotiates a maximum quantity of coalesced SQEs MCS in each I/O submission queue with the NVMe controller. The MCS obtained through negotiation is a smaller value of a maximum quantity of coalesced SQEs in each I/O submission queue supported by the NVMe controller and a maximum quantity of coalesced SQEs in each I/O submission queue supported by the host.

In another possible implementation, the first PCIe packet further includes depth information M of the target I/O submission queue, where M indicates a quantity of SQEs carried in the first PCIe packet, and where 1≤M≤MCS.

In another possible implementation, before the first PCIe packet is sent, when an SQE coalescing condition is met, the host uses at least two SQEs as payload data of the first PCIe packet. One data operation request corresponds to one SQE, and each data operation request is used to perform a read or write operation on a storage medium managed by the NVMe controller. The SQE coalescing condition includes: a maximum coalesced SQE block (MCSB) size meets a third threshold, or a time recorded by an I/O submission queue coalescing timer (SQT) meets a fourth threshold.

In another possible implementation, the host receives a second PCIe packet sent by the NVMe controller, where the second PCIe packet includes entrance information of a target I/O completion queue and at least one CQE, and where each CQE is an operation result of a data operation request that is carried in each SQE and that is executed by the NVMe controller; and stores the at least one CQE in the target I/O completion queue based on the entrance information of the target I/O completion queue.

In another possible implementation, the entrance information of the target I/O completion queue is a unique second PCIe address in the addressable PCIe address space of the host, and a process in which the host stores the at least one CQE in the target I/O completion queue based on the entrance information of the target I/O completion queue includes: a third address is first determined based on the second PCIe address, where the third address is an address at which the target I/O completion queue is stored in the memory of the host; and then the at least one CQE is stored in the target I/O completion queue based on the third address.

In another possible implementation, a process in which the host determines the third address based on the second PCIe address includes: an identifier of the target I/O completion queue is first determined based on the second PCIe address, and then the third address is determined based on the identifier of the target I/O completion queue.

In another possible implementation, the host calculates the identifier of the target I/O completion queue according to the following formula:

$$\text{the identifier of the target I/O completion queue} = \frac{ADD_{21} - ADD_{22}}{MCC \times 64}.$$

Herein, $ADD_{21}$ is the second PCIe address of the target I/O completion queue, $ADD_{22}$ is a start address that is of consecutive address spaces allocated from the addressable PCIe address space of the host and that is used to identify each I/O completion queue, and the MCC is a maximum quantity of coalesced CQEs in each I/O completion queue.

The host stores the at least one CQE in the memory of the host based on the identifier of the target I/O completion queue.

In another possible implementation, the host is an embedded processor, and the embedded processor can send a PCIe packet with a capacity of at least 64 bytes.

In a possible embodiment, in addition to using a segment of consecutive first address spaces in a base address register to allocate PCIe addresses to a plurality of I/O completion queues, the host may also use several inconsecutive storage spaces in the base address register to represent all I/O completion queues. In this case, the host and the NVMe controller each record a mapping relationship between an address allocated to each I/O completion queue and an identifier of the I/O completion queue, and the NVMe controller may send the second PCIe packet to the host based on the mapping relationship. The second PCIe packet includes a PCIe address allocated by the host to the target I/O completion queue, and the PCIe address is used as the entrance information of the target I/O completion queue. Therefore, the host may parse the second PCIe packet to obtain a PCIe address field allocated to the target I/O submission queue; then determine, based on the mapping relationship, an identifier of an I/O completion queue corresponding to the PCIe address field; and store the at least one CQE of the second PCIe packet in the target I/O completion queue based on the identifier of the I/O completion queue. In this way, a process in which the host stores the at least one CQE based on the entrance information of the target I/O completion queue is completed. In the foregoing process, an interrupt mechanism in a conventional technology can also be cancelled, and a data processing process is simplified. In addition, the NVMe controller may send, in a push manner using a same PCIe packet, a plurality of CQEs to the host in a CQE coalescing manner in the method shown in FIG. 3A, FIG. 3B, and FIG. 3C. This reduces a quantity of message packets between the host and the NVMe controller, and improves data processing efficiency.

In another possible embodiment, the addressable PCIe address space of the host includes an address space of the memory in the host and an address space of a PCIe base address register in the host. In addition to using address in the address space of the base address register to map identifiers of all I/O completion queues in the foregoing step, addresses in the address space of the memory in the host may also be used to map the identifiers of all the I/O completion queues in this embodiment of the present application. The identifier of each I/O completion queue corresponds to a unique address. In this case, the host and the NVMe controller each store a mapping relationship between an address in the address space of the memory and an identifier of an I/O completion queue. The NVMe controller may send, to the host based on the mapping relationship, a PCIe packet that carries at least one CQE. Alternatively, the host may determine, based on the mapping relationship and a mapping address carried in the PCIe packet, an identifier of an I/O completion queue corresponding to the mapping address, and further store the at least one CQE in the target I/O completion queue. According to the foregoing method, an interrupt mechanism in a conventional technology can also be cancelled, and a data processing process is simplified. In addition, the NVMe controller may send, in a CQE coalescing manner shown in FIG. 3A, FIG. 3B, and FIG. 3C, a plurality of CQEs to the host using a same PCIe packet. This reduces a quantity of message packets between the host and the NVMe controller, and improves data processing efficiency.

In another possible implementation, in addition to identifying the target I/O completion queue according to a PCIe standard using an address, the NVMe controller may also transmit the identifier of the target I/O completion queue to the host based on a pre-agreement using a specified field in a PCIe packet or a part of payload data. Then the host parses, based on the pre-agreement, the PCIe packet using the foregoing specified field (for example, a reserved field in the PCIe packet or a start bit of the payload data), to obtain the identifier of the target I/O completion queue carried in the PCIe packet, and stores an operation result in the I/O completion queue.

In another possible implementation, the host records a correspondence between an I/O submission queue and an I/O completion queue. Correspondingly, the second PCIe packet may also directly carry the identifier of the target I/O submission queue. After receiving the second PCIe packet, the host may obtain the identifier of the target I/O submission queue; then determine the target I/O completion queue based on the correspondence between an I/O submission queue and an I/O completion queue; and store, in the target I/O completion queue, the at least one CQE carried in the second PCIe packet.

According to a third aspect, this application provides a data processing method, and the method includes: communicating, by an NVMe controller, with a host using a PCIe bus standard; receiving, by the NVMe controller, a first PCIe packet sent by the host; and storing at least one SQE in a target I/O submission queue based on entrance information of the target I/O submission queue. A memory in the NVMe controller is provided with at least one I/O submission queue. The first PCIe packet includes the entrance information of the target I/O submission queue and the at least one SQE. One SQE corresponds to one data operation request, and each data operation request is used to perform a read or write operation on a storage medium managed by the NVMe controller.

In this application, data is stored in an I/O submission queue on a side of the NVMe controller, and the host directly sends an SQE to the NVMe controller using a PCIe packet. Therefore, this avoids a case in which the host needs to update, when sending each SQE, an I/O submission queue tail doorbell register (located in a storage area of the NVMe controller) to notify the NVMe controller of a to-be-executed data operation request, and the NVMe controller reads the SQE from an I/O submission queue of a memory in the host based on a doorbell using a PCIe. The host and the NVMe controller communicate with each other based on the entrance information of the target I/O submission queue, and the NVMe controller may store the SQE based on the entrance information of the target I/O submission queue. Therefore, a doorbell mechanism in a conventional technology can be cancelled, and a data processing process is simplified.

In a possible implementation, the entrance information of the target I/O submission queue is a unique first PCIe address in an addressable PCIe address space of the host, and a process in which the NVMe controller stores the at least one SQE in the target I/O submission queue based on the entrance information of the target I/O submission queue includes: determining a second address based on the first PCIe address, where the second address is an address at which the target I/O submission queue is stored in the memory of the NVMe controller; and storing the at least one SQE in the target I/O submission queue based on the second address.

In a possible implementation, a process in which the NVMe controller determines the second address based on the first PCIe address includes: an identifier of the target I/O submission queue is first determined based on the first PCIe address of the target I/O submission queue, and then the second address is determined based on the identifier of the target I/O submission queue.

In this application, all I/O submission queues may be marked using PCIe addresses in the addressable PCIe address space of the host. One PCIe address is allocated to each I/O submission queue, and the PCIe address is used as entrance information of the I/O submission queue. The NVMe controller may store the at least one SQE in the target I/O submission queue based on the PCIe address.

In another possible implementation, the NVMe controller calculates the identifier of the target I/O submission queue according to the following formula:

$$\text{the identifier of the target I/O submission queue} = \frac{ADD_{11} - ADD_{12}}{MCS \times 64}.$$

Herein, $ADD_{11}$ is the first PCIe address of the target I/O submission queue, $ADD_{12}$ is a start address that is of consecutive address spaces allocated from the addressable PCIe address space of the host and that is used to identify each I/O submission queue, and the MCS is a maximum quantity of coalesced SQEs in each I/O submission queue. Through calculation using the foregoing formula, the NVMe controller may determine the identifier of the target I/O submission queue, determine a storage location of the target I/O submission queue in the NVMe controller based on the identifier of the target I/O submission queue, and further store the at least one SQE in the target I/O submission queue.

In another possible implementation, before the NVMe controller receives the first PCIe packet of the host, the NVMe controller receives a creation instruction of the host, sets the at least one I/O submission queue in the memory of the NVMe controller according to the creation instruction, and records an association relationship between an identifier of each I/O submission queue and information about an address of each I/O submission queue in the memory of the NVMe controller. According to the method in the foregoing process, the NVMe controller may create the at least one I/O submission queue according to a service requirement, to store data in the I/O submission queue.

In another possible implementation, before the NVMe controller receives the creation instruction of the host, the NVMe controller negotiates the maximum quantity of coalesced SQEs MCS in each I/O submission queue with the host. The MCS obtained through negotiation is a smaller value of a maximum quantity of coalesced SQEs in each I/O submission queue supported by the NVMe controller and a maximum quantity of coalesced SQEs in each I/O submission queue supported by the host. The NVMe controller and the host may determine, in an MCS negotiation manner, a maximum quantity of SQEs that can be pushed by the host each time, in other words, a maximum quantity of SQEs that can be carried in one PCIe packet. In this push manner, a quantity of packets between the host and the NVMe controller can be reduced, and data processing efficiency is improved.

In another possible implementation, the first PCIe packet further includes depth information M of the target I/O submission queue, M indicates a quantity of SQEs carried in the first PCIe packet, and 1≤M≤MCS. The storing, by the NVMe controller, the at least one SQE in the target I/O submission queue includes: determining a preset sequence of M SQEs, and storing the M SQEs in the target I/O submission queue in the preset sequence of the M SQEs. The preset sequence of the M SQEs is a sequence in which the host receives data operation requests. According to the descriptions of the foregoing process, the NVMe controller may store the SQEs in the sequence in which the host receives data operation requests, in order to ensure that a sequence of storing SQEs in an I/O submission queue in the memory of the NVMe controller is consistent with the sequence in which the host receives data operation requests.

According to a fourth aspect, this application provides a data processing method, and the method includes: a memory in a host is provided with at least one I/O completion queue; and an NVMe controller obtains at least one SQE from a target I/O submission queue, performs, based on a data operation request carried in the at least one SQE, a read or write operation on a storage medium managed by the NVMe controller, and sends a second PCIe packet to the host. The second PCIe packet includes entrance information of a target I/O completion queue and at least one completion queue entry (CQE). Each CQE is an operation result of a data operation request that is carried in each SQE and that is executed by the NVMe controller. According to the descriptions of the foregoing process, the NVMe controller may also store the at least one CQE in the target I/O completion queue based on the entrance information of the target I/O completion queue. Therefore, an interrupt mechanism in a conventional technical solution is cancelled, a data processing process is simplified, and processing efficiency is improved.

In a possible implementation, when a CQE coalescing condition is met, the NVMe controller uses operation results of at least two data operation requests as payload data of the second PCIe packet. One CQE corresponds to an operation result of one data operation request. The CQE coalescing condition includes: a maximum coalesced CQE block (MCCB) size meets a first threshold, or a time recorded by an I/O completion queue coalescing timer meets a second threshold. The NVMe controller may send a plurality of CQEs to the host in a push manner using a same PCIe packet. In other words, the NVMe controller simultaneously uses a plurality of CQEs as payload data of one PCIe packet, and sends the packet to the host. This reduces a quantity of packets between the host and the NVMe controller, and improves processing efficiency.

In another possible implementation, the second PCIe packet further includes depth information N of the target I/O completion queue, and N indicates a quantity of CQEs carried in the second PCIe packet. The NVMe controller uses N CQEs as the payload data of the second PCIe packet in a preset sequence, where 1≤N≤MCC, and where the MCC is a positive integer. The preset sequence of the N CQEs is a sequence in which the NVMe controller completes operation results generated for corresponding SQEs. It is ensured, in the second PCIe packet using the preset sequence, that a sequence in which the host stores operation results is consistent with a sequence in which the NVMe controller actually generates operation results.

In another possible implementation, the host is an embedded processor, and the embedded processor can send a PCIe packet with a capacity of at least 64 bytes.

According to a fifth aspect, this application provides a data processing apparatus, and the apparatus includes modules configured to perform the data processing methods in any one of the foregoing aspects or the possible implementations of the foregoing aspects.

According to a sixth aspect, this application provides a storage system for data processing. The storage system includes a host, an NVMe controller, a first memory, and a second memory. The host, the NVMe controller, the first memory, and the second memory communicate with each other using a PCIe bus. The first memory stores a computer instruction executed by the host, and stores data in an I/O completion queue. The second memory stores a computer instruction executed by the NVMe controller, and stores data in an I/O submission queue. When the storage system runs, the NVMe controller is configured to execute a computer executable instruction in the second memory, to perform operation steps of the method according to the first aspect or any possible implementation of the first aspect and the method according to the third aspect or any possible implementation of the third aspect using hardware resources in the storage system. The host is configured to execute a computer executable instruction in the first memory, to perform operation steps of the method according to the second aspect or any possible implementation of the second aspect and the method according to the fourth aspect or any possible implementation of the fourth aspect using hardware resources in the storage system.

According to a seventh aspect, this application provides a computer readable storage medium, and the computer readable storage medium stores an instruction. When the instruction runs on a computer, the computer is enabled to perform the methods in the foregoing aspects.

According to an eighth aspect, this application provides a computer program product including an instruction. When the instruction runs on a computer, the computer is enabled to perform the methods in the foregoing aspects.

In this application, the implementations provided in the foregoing aspects can be further combined to provide more implementations.

DESCRIPTION OF EMBODIMENTS

The following describes the technical solutions in the embodiments of the present application with reference to the accompanying drawings in the embodiments of the present application.

Figure 1:
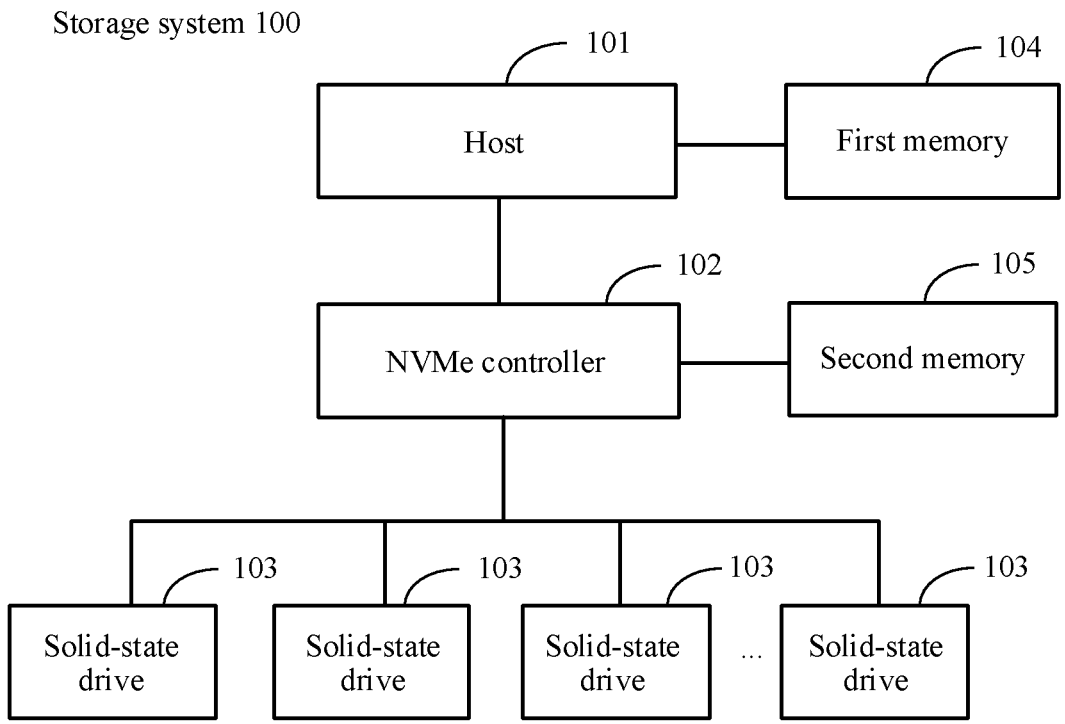
FIG. 1 is a schematic diagram of an architecture of a storage device according to an embodiment of the present application.

FIG. 1 is a schematic diagram of an architecture of a storage system 100 according to an embodiment of the present application. As shown in the figure, the storage system 100 includes a host 101, an NVMe controller 102, at least one solid-state drive (SSD) 103, a first memory 104, and a second memory 105. The host and the NVMe controller each are provided with a memory. For ease of subsequent description, a memory in the host is referred to as the first memory 104, and a memory in the NVMe controller is referred to as the second memory 105. The host 101, the NVMe controller 102, the at least one SSD 103, the first memory 104, and the second memory 105 communicate with each other using a Peripheral Component Interconnect express (PCIe) bus standard.

In this embodiment of the present application, the host 101 is a processor, and the processor may be a central processing unit (CPU), or the processor may be another general-purpose processor, a digital signal processor (DSP), an application-specific integrated circuit (ASIC), a field-programmable gate array (FPGA) or another programmable logic device, a discrete gate or transistor logic device, a discrete hardware component, or the like. The general-purpose processor may be a microprocessor, any conventional processor, or the like. Alternatively, the processor may be a system on a chip (SoC) or an embedded processor. The processor can send a PCIe packet with a capacity of at least 64 bytes. The first memory 104 and the second memory 105 each may be implemented by a random-access memory (RAM) or another storage medium. In the storage system, the NVMe controller 102 and the at least one solid-state drive 103 may be collectively referred to as an NVMe subsystem. The NVMe subsystem is configured to receive and execute a data operation request sent by the host. Each data operation request is used to perform a read or write operation on the solid-state drive 103 managed by the NVMe controller 102.

It should be understood that, in the architecture of the storage system shown in FIG. 1, there may be one or more NVMe controllers 102, and only one NVMe controller is shown in the figure. When the storage system includes a plurality of NVMe controllers, an active-state NVMe controller communicates with the host, and other NVMe controllers are used as standby-state NVMe controllers. When the active-state NVMe controller is faulty, one standby-state NVMe controller is upgraded to the active-state NVMe controller. In this embodiment of this application, an example in which the storage system includes only one NVMe controller is used for description.

An NVMe data processing process is implemented based on an input/output (I/O) submission queue (SQ) and an I/O completion queue (CQ). The I/O submission queue is used to store a data operation request. The data operation request is invoked by an upper-layer application and is sent to the host using a host interface. The data operation request includes a request of reading data stored in the SSD and a request of writing data into the SSD. For example, the first memory 104 of the host 101 is configured to store data in the I/O completion queue, and the second memory 105 of the NVMe controller 102 is configured to store data in the I/O submission queue.

The I/O submission queue is a logical concept and includes one or more units. Each unit stores one data operation request, and each data operation request may be stored in a storage space of a maximum of 64 bytes. The I/O submission queue corresponds to a ring buffer used for storing one or more data operation requests, and may be represented using a physical region page (PRG) or a scatter/gather list (SGL). Each data operation request (which may also be referred to as a submission queue entry (SQE) or a submission queue element (SQE)) may be stored in one unit of the I/O submission queue. The unit may be referred to as a slot of the I/O submission queue, and each slot corresponds to two PRGs or one SGL in the buffer. The I/O submission queue is provided with a head pointer and a tail pointer. The head pointer is used to indicate a slot of an SQE that can be removed at a current moment, and the tail pointer is used to indicate a slot of a newly added SQE that can be stored at a current moment. In an initialization phase, the head pointer=the tail pointer=0. Each time a new SQE is added to the I/O submission queue, 1 is added to the tail pointer. Each time an SQE is removed from the I/O submission queue, 1 is added to the head pointer. To-be-executed data operation requests need to be successively stored in slots of a submission queue in a receiving sequence, and then are successively read in a first in first out (FIFO) sequence.

The I/O completion queue is a ring buffer used for storing an operation result of a data operation request completed by the NVMe controller. Similar to a structure of the I/O submission queue, the I/O completion queue is also a logical concept, and includes one or more units. Each unit may be referred to as a slot. The I/O completion queue also corresponds to a ring buffer used for storing operation results of one or more data operation requests, and may be represented using a PRG or an SGL. The operation result of each data operation request may also be referred to as a completion queue entry (CQE) or a completion queue element (CQE). Each I/O submission queue corresponds to one I/O completion queue, and one I/O completion queue may correspond to a plurality of I/O submission queues. A matching relationship between an I/O completion queue and an I/O submission queue is specified by the host. An operation result of a data operation request in each I/O submission queue is stored in a specified I/O completion queue.

Further, the NVMe data processing process further includes a management submission queue and a management completion queue. The management submission queue is used to store management requests of the host and the NVMe controller. For example, a request of creating an I/O submission queue by the host may be stored in the management submission queue. The management completion queue is used to store an operation result of a data operation request completed by the NVMe controller. For example, the management submission queue and the management completion queue may be stored in the first memory of the host. Logical structures of the management submission queue and the management completion queue are similar to that of the I/O submission queue and the I/O completion queue. Details are not described herein again.

In a conventional NVMe data processing process, the memory in the host implements the I/O submission queue and the I/O completion queue. In addition, the host and the NVMe controller need to communicate with each other in an interrupt manner using a doorbell mechanism. The I/O submission queue includes a data operation request, and an operation result of the data operation request is stored in the I/O completion queue. Consequently, an entire NVMe data processing process is complex.

In the following embodiments of the present application, a process of implementing an I/O submission queue and an I/O completion queue is mainly improved, but the management submission queue and the management completion queue are still implemented using a conventional technical solution. In other words, the management submission queue and the management completion queue are still stored in the memory of the host. In a data processing process, the host first stores a management request in the management submission queue; then updates a state of a submission queue tail doorbell register in the NVMe controller using a doorbell mechanism; and instructs the NVMe controller to obtain a to-be-executed management request. Then, the NVMe controller obtains and executes the to-be-executed management request; generates an operation result of the to-be-executed management request; then notifies, in an interrupt form, the host that the to-be-executed management request is processed; and finally stores the operation result of the to-be-executed management request in the management completion queue in a DMA write manner.

An embodiment of the present application provides a data processing method. The second memory 105 (for example, a RAM) of the NVMe controller 102 stores an I/O submission queue. The host sends a data operation request to the NVMe controller 102 based on entrance information of the I/O submission queue using a PCIe packet. The NVMe controller 102 stores the data operation request in a target I/O submission queue of the second memory 105 of the NVMe controller 102 based on the entrance information of the I/O submission queue, and the NVMe controller 102 may directly obtain the data operation request from the second memory 105. Compared with a conventional technical solution in which an NVMe controller needs to obtain a data operation request from a memory in a host, in the technical solution provided in this embodiment of the present application, an addressing path in a PCIe bus is shorter, and a data processing process is less time-consuming. In addition, in an entrance-based I/O submission queue access manner, a process in which the host needs to instruct, using a doorbell mechanism, the NVMe controller to obtain a data operation request is cancelled in a conventional NVMe data processing process, and this simplifies a data processing process. Further, the host 101 may send a plurality of data operation requests to the NVMe controller 102 in a push manner using one PCIe packet, and this reduces a quantity of communication packets between the host 101 and the NVMe controller 102, and improving communication efficiency. In addition, after processing the foregoing data operation request, the NVMe controller 102 may store an operation result of the data operation request in an I/O completion queue of the host 101 based on entrance information of the I/O completion queue using a PCIe packet. Therefore, a process in which the NVMe controller needs to notify, through interruption, the host that an operation result of a completed data operation request needs to be stored in an I/O completion queue is cancelled in the conventional technical solution, the NVMe data processing process is further simplified, and the NVMe data processing process is less time-consuming. In addition, the NVMe controller may also send operation results of a plurality of data operation requests to the host 101 in a push manner using a same PCIe packet. This reduces a quantity of communication packets between the host 101 and the NVMe controller 102, and improves data processing efficiency.

It is worthwhile to note that the NVMe data processing process includes a plurality of I/O submission queues and I/O completion queues. For ease of description, in the following description content of the embodiments of the present application, a data processing process including an I/O submission queue and an I/O completion queue associated with the I/O submission queue is used as an example to describe the technical solutions of the present application.

With reference to the accompanying drawings in the embodiments of the present application, the following further describes a data processing method provided in the present application.

Figure 2:
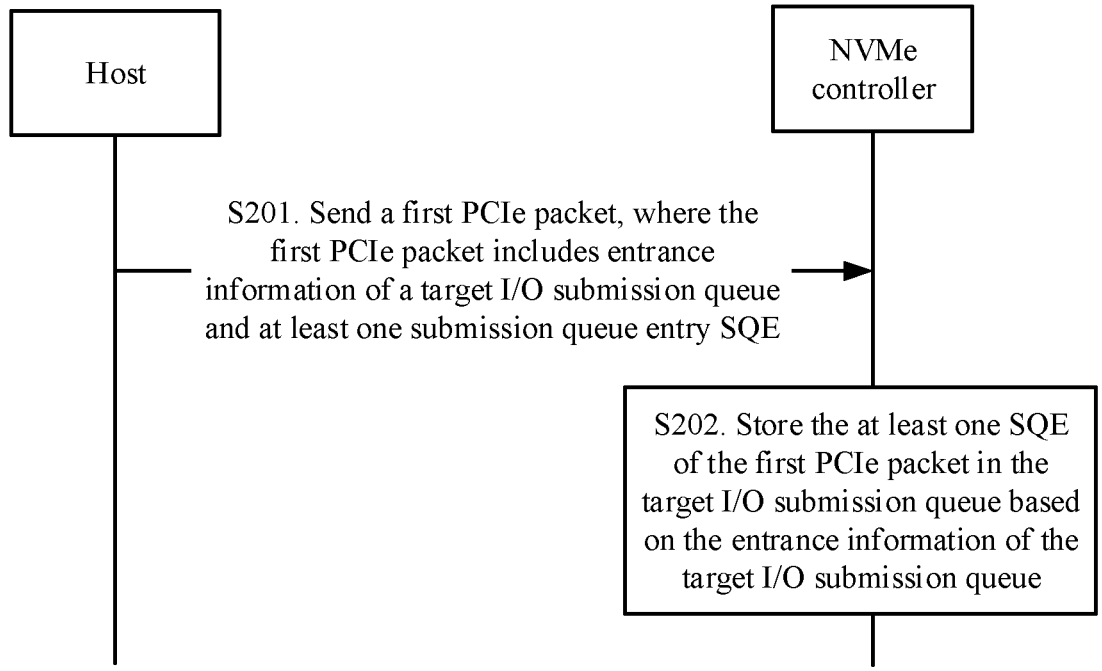
FIG. 2 is a schematic flowchart of an NVMe based data processing method according to an embodiment of the present application.

FIG. 2 is a schematic flowchart of a data processing method according to an embodiment of the present application. As shown in the figure, the data processing method includes the following steps.

S201. A host sends a first PCIe packet to an NVMe controller, where the first PCIe packet includes entrance information of a target I/O submission queue and at least one SQE.

A storage system may include a plurality of I/O submission queues at a same moment, and each I/O submission queue is used to store different types of to-be-executed data operation requests or to-be-executed data operation requests sent by different applications. When receiving a data operation request, the host may determine, according to a preset rule, an I/O submission queue in which the data operation request needs to be stored. For example, if the operation request carries an identifier of an application, the host determines, based on the identifier of the application function program, an I/O submission queue associated with the operation request. For example, the host creates the I/O submission queue according to a service requirement. In other words, a matching relationship between an application and an I/O submission queue is preset on the host. When the host receives the data operation request, the host may determine, based on the matching relationship between an application that sends a data request and an I/O submission queue, a target I/O submission queue in which the data operation request needs to be stored. The target I/O submission queue is an I/O submission queue that matches the data operation request.

Further, in this embodiment of the present application, a second memory in the NVMe controller stores data in the I/O submission queue, and the host does not sense a data structure and a storage location of the I/O submission queue. For the host, different SQEs in a same I/O submission queue are all stored in different slots of the I/O submission queue, which is similar to a case in which the host stores SQEs in the second memory of the NVMe controller using an entrance of an I/O submission queue. The host does not need to learn how the NVMe controller stores an SQE in a slot of a target SQ. Entrance information is mainly used to enable the controller to identify an I/O submission queue or an I/O completion queue corresponding to a currently received PCIe packet, and the entrance information may be an identifier or an address that uniquely identifies an I/O submission queue, or other description content that can uniquely identify an I/O submission queue. In addition, the entrance information may also be referred to as an entrance identifier, an entrance address, or a name in another form.

Optionally, different priorities may be further assigned to I/O submission queues. When receiving a data operation request sent by an upper-layer application, the host may send the data operation request to a specified I/O submission queue based on a type of the data operation request and a priority.

The host may be understood as an enhanced processor, and the enhanced processor may be an embedded processor. The embedded processor can send a PCIe write transaction of at least 64 bytes each time.

S202. The NVMe controller stores the at least one SQE of the first PCIe packet in the target I/O submission queue based on the entrance information of the target I/O submission queue.

In this embodiment of the present application, the host sends the at least one SQE to the NVMe controller based on the entrance information of the target I/O submission queue. The NVMe controller stores the at least one SQE in the target I/O submission queue in the memory of the NVMe controller, and the NVMe controller may directly obtain the SQE from the memory in the NVMe controller and perform the SQE. A doorbell mechanism in a conventional technical solution is cancelled, and the host and the NVMe controller need to communicate with each other based only on an entrance. Therefore, a data processing process is simplified and is accordingly less time-consuming.

Figure 3A:
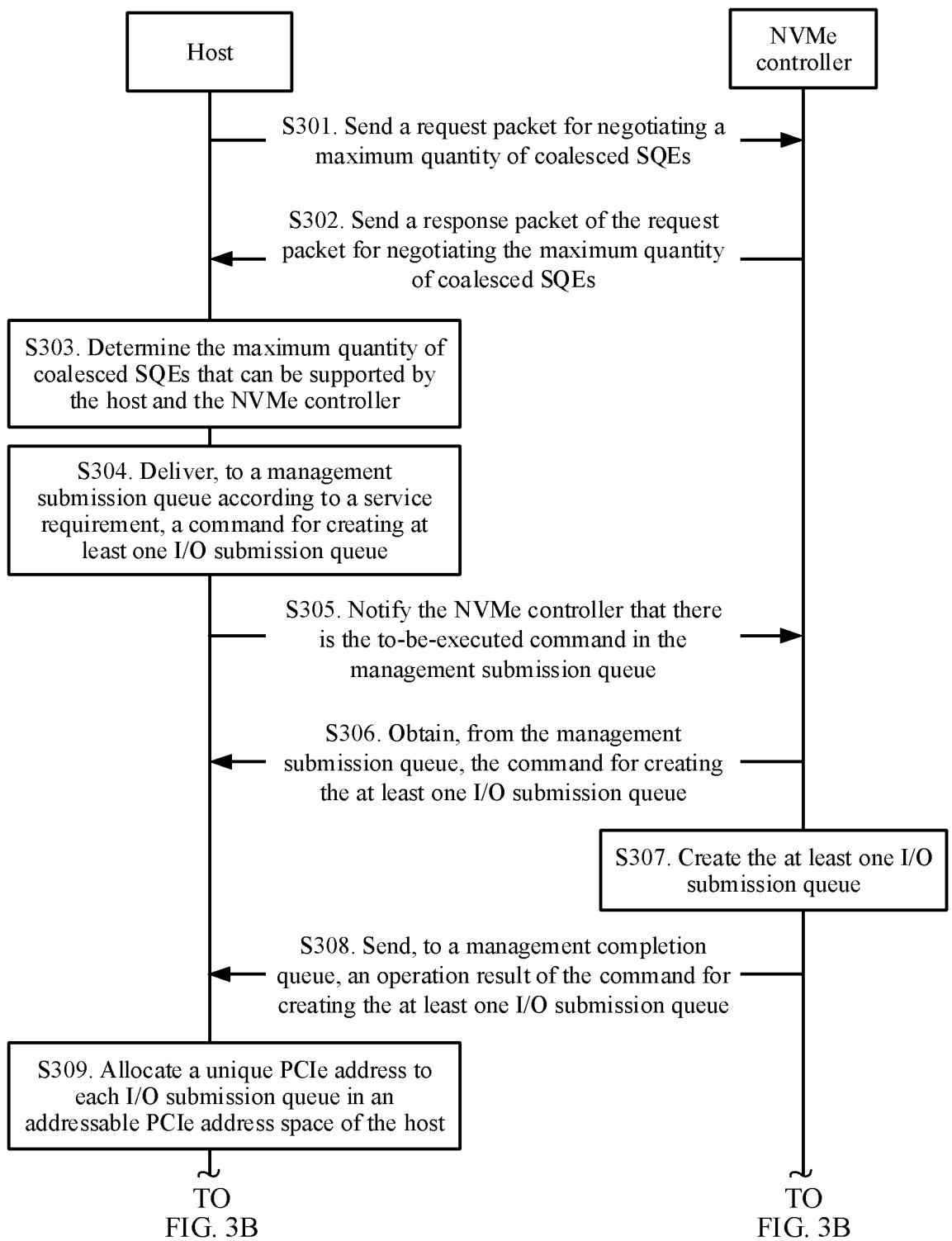
FIG. 3A, FIG. 3B, and FIG. 3C are a schematic flowchart of another NVMe based data processing method according to an embodiment of the present application.
Figure 3B:
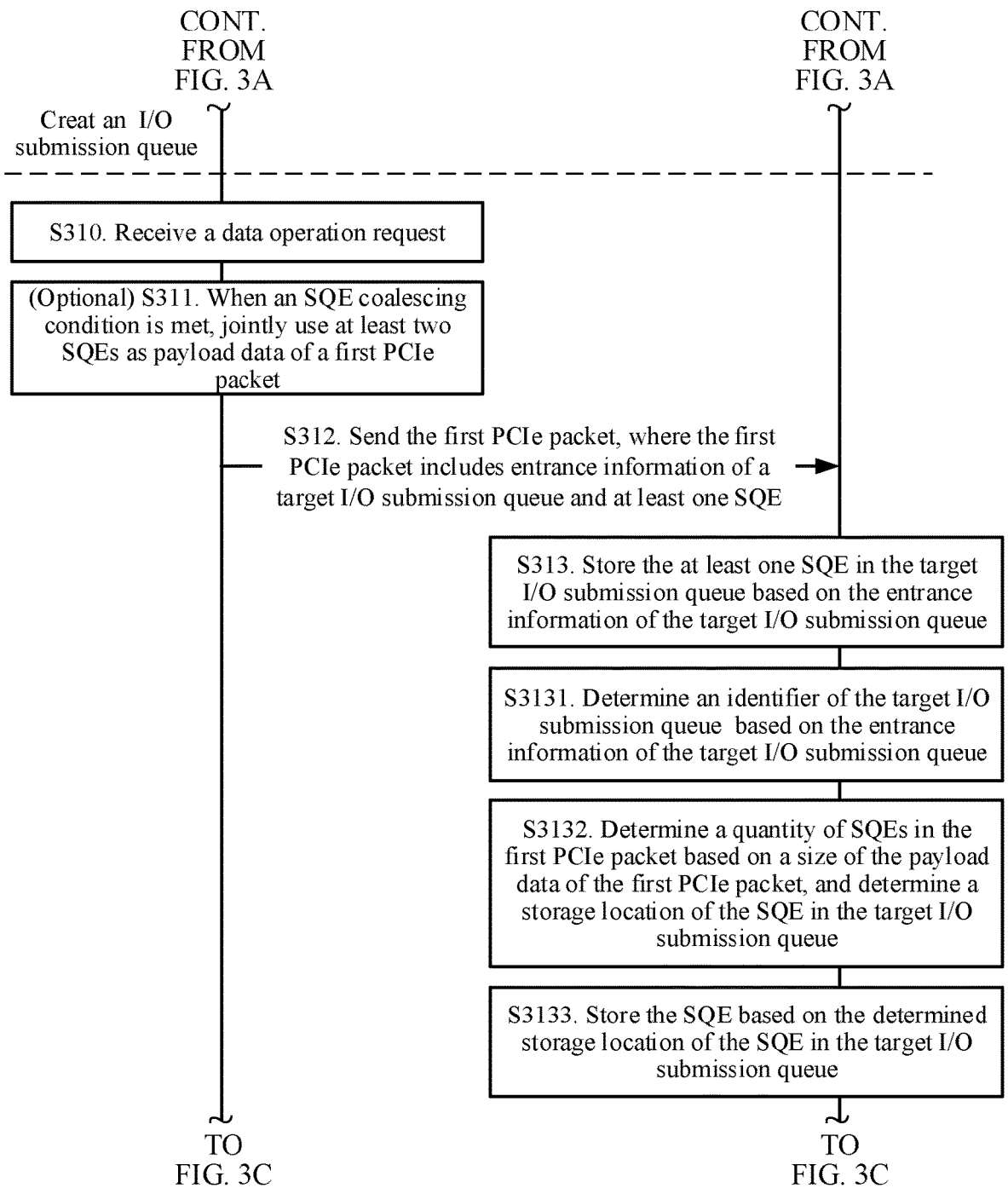
Figure 3C:
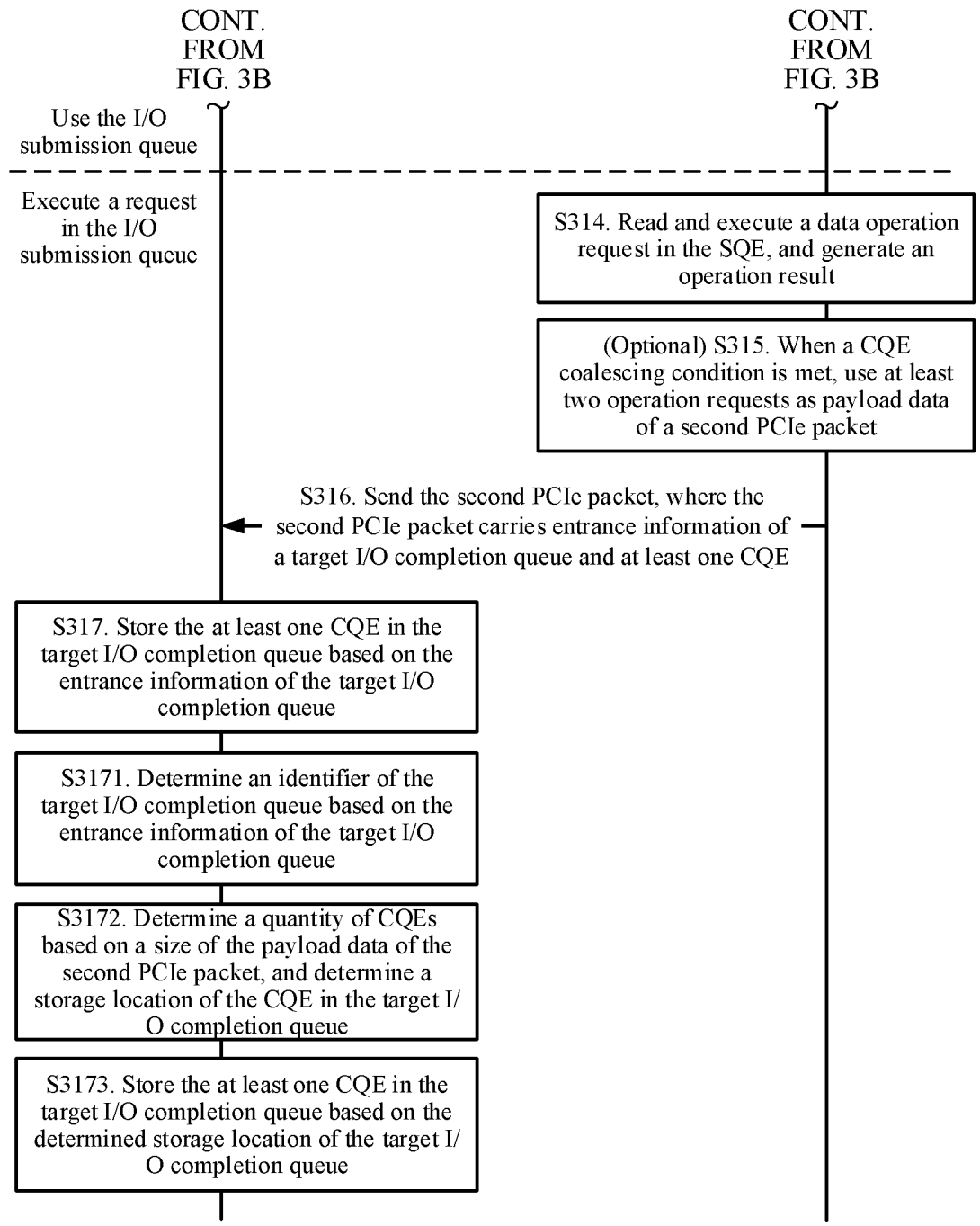

With reference to FIG. 3A, FIG. 3B, and FIG. 3C, the following further describes a data processing method according to an embodiment of the present application. FIG. 3A, FIG. 3B, and FIG. 3C are a schematic flowchart of another data processing method according to an embodiment of this application. As shown in the figure, the method includes the following steps.

S301. A host sends, to an NVMe controller, a packet for negotiating a maximum quantity of coalesced SQEs.

S302. The NVMe controller sends, to the host, a response packet of a request for negotiating the maximum quantity of coalesced SQEs.

S303. The host determines the maximum quantity of coalesced SQEs that can be supported by the host and the NVMe controller.

In an initialization phase of a storage system, the host and the NVMe controller first need to negotiate the maximum quantity of coalesced SQEs (MCS). The MCS is a maximum quantity of SQEs that can be carried in a PCIe packet and that is determined through negotiation between the host and the NVMe controller. The host and the NVMe controller may preset, based on hardware configurations of the host and the NVMe controller, MCSs supported by the host and the NVMe controller; or a maintenance engineer may specify, based on network communication statuses of the host and the NVMe controller, the MCSs supported by the host and the NVMe controller. The host and the NVMe controller support different MCSs, and the MCS that can be supported by the host and the NVMe controller may be determined through negotiation. The MCS that can be supported by the host and the NVMe controller is a smaller value in MCSs supported by the host and MCSs supported by the NVMe controller. After determining the MCS through negotiation, the host may add a plurality of data operation requests to one PCIe packet when sending to-be-executed data operation requests to the NVMe controller, to reduce a quantity of communication packets between the host and the NVMe controller, and improve data processing efficiency.

Optionally, the host and the NVMe controller may further negotiate a maximum quantity of coalesced CQEs (MCC) using steps similar to step S301 to step S303. The MCC may be negotiated in a system initialization phase, or before an I/O submission queue is created, or before the NVMe controller sends an operation result of a data operation request to the host. This embodiment of the present application imposes no limitation.

Similar to the MCS, the MCC is a maximum quantity of CQEs that can be carried in a PCIe packet and that is determined through negotiation between the host and the NVMe controller. The host and the NVMe controller may preset, based on hardware configurations of the host and the NVMe controller, MCCs supported by the host and the NVMe controller; or a maintenance engineer may specify, based on network communication statuses of the host and the NVMe controller, the MCCs supported by the host and the NVMe controller. The host and the NVMe controller support different MCCs, and the MCC that can be supported by the host and the NVMe controller may be determined through negotiation. The MCC that is determined through negotiation and that can be supported by the host and the NVMe controller is a smaller value in MCCs supported by the host and MCCs supported by the NVMe controller. After determining the MCC through negotiation, the NVMe controller may add a plurality of operation results to one PCIe packet when sending operation results of data operation requests to the host, to reduce a quantity of communication packets between the host and the NVMe controller, and improve data processing efficiency.

Optionally, an MCC negotiation process and an MCS negotiation process may be simultaneously performed, or may be separately performed. In other words, the host may negotiate the MCC and the MCS with the NVMe controller using one request packet for negotiating the MCS and the MCC, or the host may negotiate the MCC and the MCS with the NVMe controller using two different request packets respectively for negotiating the MCS and for negotiating the MCC.

After the host and the NVMe controller determine the MCS through negotiation, the host may create at least one I/O submission queue according to a service requirement using step S304 to step S308. An example process is as follows.

S304. The host delivers, to a management submission queue according to the service requirement, a request of creating the at least one I/O submission queue.

S305. The host notifies the NVMe controller that the management submission queue includes the to-be-executed request.

S306. The NVMe controller obtains, from the management submission queue, the request of creating the at least one I/O submission queue.

S307. The NVMe controller creates the at least one I/O submission queue.

S308. The NVMe controller sends, to the host, an operation result of the request of creating the at least one I/O submission queue, and stores the operation result to a management completion queue.

Step S304 to step S308 are a process of creating the at least one I/O submission queue. In this embodiment of the present application, the request of creating the at least one I/O submission queue includes a quantity of to-be-created I/O submission queues. In a process of creating an I/O submission queue, the host and the NVMe controller communicate with each other still using a doorbell mechanism and an interrupt mechanism in a conventional technical solution. For example, the host stores a to-be-executed management request in the management submission queue; updates a management submission queue tail doorbell register (located in a second memory of the NVMe controller); and notifies the NVMe controller of the to-be-executed management request. The NVMe controller obtains the to-be-executed management request in the management submission queue in a direct memory access (DMA) read manner. After processing the request of creating the at least one I/O submission queue, the NVMe controller sends an interruption signal to the host to notify the host that there is a completed operation result to be stored in an I/O completion queue; and then stores the operation result in the corresponding management completion queue in a DMA write manner.

A process in which the NVMe controller creates the at least one I/O submission queue in the second memory is not limited in this application. In a possible implementation, the process of creating an I/O submission queue includes: the NVMe controller divides, based on the quantity of to-be-created submission queues in the request of creating the at least one I/O submission queue, the second memory into storage spaces for storing an SQE of each I/O submission queue, and the NVMe controller records information about a location of each I/O submission queue in the second memory. A ring buffer that constitutes each completion queue may be represented using a PRG or an SGL. In addition, the storage space for implementing the I/O submission queue may be a range of consecutive addresses in the second memory, or may be a range of inconsecutive addresses. The present application imposes no limitation.

A request of creating an I/O submission queue in this embodiment of the present application and a request of creating an I/O submission queue in a conventional technology are similar, but are different in terms of the following points:

(1) Indication content of a PRP entry 1 domain is cancelled.

(2) Indication content of a PC domain is cancelled.

(3) A QID is used to indicate an entrance identifier of an SQ, and is unrelated to a tail doorbell of a conventional SQ.

Optionally, the request of creating an I/O submission queue may further include a depth of each I/O submission queue, and the queue depth may be set to the MCS. It is ensured that an SQE in each received PCIe packet can be successfully stored in a target I/O submission queue.

S309. The host allocates a unique PCIe address to each I/O submission queue in an addressable PCIe address space of the host.

The addressable PCIe address space of the host includes an address space of a memory in the host and an address space that can be accessed by the host in a storage area of the NVMe controller, for example, an address space of a base address register (BAR) in the NVMe controller. The host may allocate the unique PCIe address to each I/O submission queue. In a data processing process, the host and the NVMe controller determine the target I/O submission queue based on the PCIe address. For ease of subsequent description, the PCIe address allocated to the target I/O submission queue is marked as a first PCIe address in the following descriptions of this embodiment of the present application.

It is worthwhile to note that, in a PCIe bus, the host can only directly access data stored in the memory of the host, and cannot directly access the storage area of the NVMe controller. In the conventional technical solution, the host may access an open storage area of the NVMe controller in a memory-mapped input/output (MMIO) manner. The open storage area that can be accessed by the host in the NVMe controller may be referred to as an addressable storage space of the host, or may be referred to as a storage space that can be accessed by the host. The host runs a root complex (RC) in the PCIe bus, and the host may access the storage area of the NVMe controller using the root complex. For example, the system maps, to a memory area of the host, the storage area that can be accessed by the host in the NVMe controller. When the host accesses the open storage area that can be accessed by the host in the NVMe controller, the root complex checks to-be-accessed address information in the data operation request. If it is found that the to-be-accessed address information is a mapping address in the storage area that can be accessed by the host in the NVMe controller, the root complex is triggered to generate a transaction layer packet (TLP), and accesses the NVMe controller using the TLP, and reads or writes target data. In addition, the NVMe controller may include several areas (attributes may be different. For example, some areas can be pre-read and some areas cannot be pre-read) that can be internally accessed by the host and that need to be mapped to the memory areas. Sizes and the attributes of the open storage areas of the NVMe controllers are written into the base address registers (BARs) in the NVMe controller. When the storage system is powered on, system software may read these BARs, respectively allocate corresponding memory areas to the BARs, and write responded memory base addresses back to the BARs.

Figure 4A:
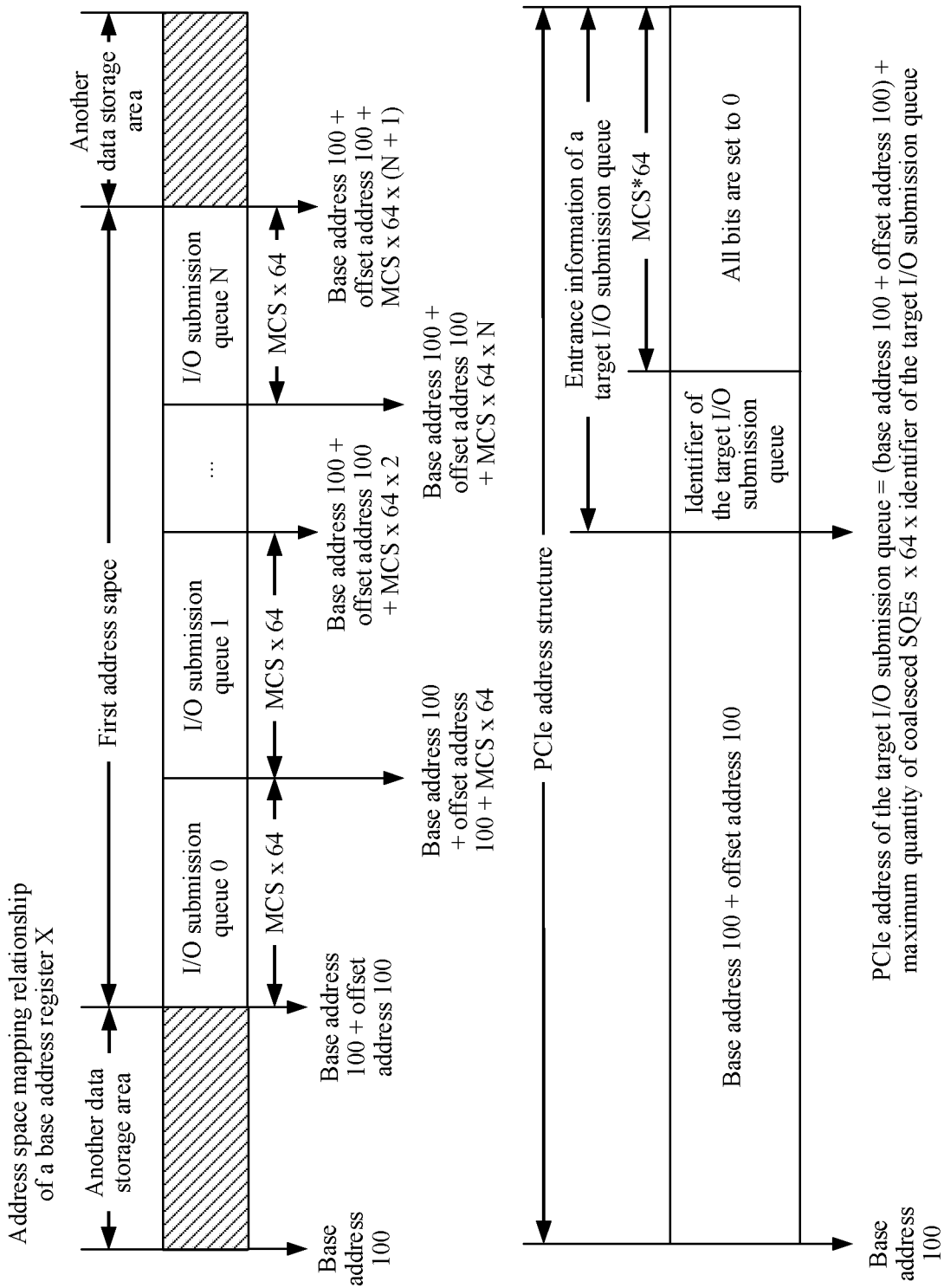
FIG. 4A is a schematic diagram in which a host allocates a PCIe address to an I/O submission queue in an address space of a base address register according to an embodiment of the present application.

FIG. 4A is a schematic diagram in which a host allocates a PCIe address to an I/O submission queue in an address space of a base address register according to an embodiment of the present application. As shown in the figure, a base address register X is an addressable address space of the host, and a base address of the base address register X is a base address 100. The host first groups a segment of consecutive address spaces into a first address space, and then allocates a unique PCIe address to each I/O submission queue in the first address space. The first address space may also be referred to as an aperture of one I/O submission queue. A process in which the host allocates a PCIe address to each I/O submission queue may be understood as that the host maps a segment of consecutive addresses in the base address register to the I/O submission queue, and the segment of consecutive PCIe addresses may be used to identify the I/O submission queue. For example, a segment of consecutive addresses from (base address 100+offset address 100) to (base address 100+offset address 100+ MCS×64) in the base address register X are allocated to an I/O submission queue 0. In this case, a PCIe address of the I/O submission queue 0 is (base address 100+offset address 100). In other words, the PCIe address of the I/O submission queue 0 is (base address 100+offset address 100+MCS×64× 0). A segment of consecutive addresses from (base address 100+offset address 100+MCS×64) to (base address 100+ offset address 100+MCS×64×2) in the base address register X are allocated to an I/O submission queue 1. In this case, a PCIe address of an I/O submission queue 1 is (base address 100+offset address 100+MCS×64×1). By analogy, a segment of consecutive addresses from (base address 100+ offset address 100+MCS×64×N) to (base address 100+offset address 100+MCS×64×(N+1)) in the base address register X are allocated to an I/O submission queue N. In this case, a PCIe address of the I/O submission queue N is (base address 100+offset address 100+MCS×64×N).

It is worthwhile to note that the first address space in FIG. 4A is a segment of address spaces in the base address register X, and a start address of the first address space may be the base address of the base address register X, or may be (base address+offset address) in the base address register. The following embodiments of the present application are described using an example in which the start address of the first address space shown in FIG. 4A is (base address+offset address).

The host records a group of data indexed by an entrance identifier of the at least one I/O submission queue. The unique PCIe address is allocated to each I/O submission queue in the PCIe base address register, and the PCIe address of each I/O submission queue indicates entrance information of the I/O submission queue.

In a possible implementation, the request of creating the at least one the I/O submission queue may further carry an association relationship between an I/O submission queue and an I/O completion queue. Therefore, after processing an SQE in the I/O submission queue, the NVMe controller stores an operation result in the I/O completion queue associated with the I/O submission queue.

In a possible implementation, when learning that the NVMe controller completes the request of creating the at least one I/O submission queue, the host may further send the association relationship between an I/O submission queue and an I/O completion queue to the NVMe controller. Therefore, after processing the SQE in the I/O submission queue, the NVMe controller stores an operation result in the I/O completion queue associated with the I/O submission queue.

The foregoing step S301 to step S309 describe how to create an I/O submission queue in this embodiment of the present application. The following step S310 to step S313 further describe how to use the I/O submission queue in this embodiment of this application.

S310. The host receives at least one data operation request.

The host receives data operation requests sent by an upper-layer application, each data operation request is stored in a slot in the target I/O submission queue as an SQE, and each SQE corresponds to one data operation request.

S311. (Optional) When an SQE coalescing condition is met, the host uses at least two data operation requests as payload data of a first PCIe packet.

The SQE coalescing condition includes at least one of the following conditions.

Condition 1: A maximum SQE coalesced block (MSCB) size meets a first threshold.

When a total size of M to-be-sent SQEs in one I/O submission queue reaches the first threshold at a current moment, the host may simultaneously use the M SQEs as payload data of a same PCIe packet, where M is greater than or equal to 2. For example, when three SQEs (an SQE 1, an SQE 2, and an SQE 3) in the I/O submission queue 1 each are in a to-be-sent state at the current moment, a total size of the three SQEs is 190 bytes, and the first threshold is 180 bytes, the host may simultaneously send the three SQEs to the NVMe controller as the payload data of the same PCIe packet.

Condition 2: Duration recorded by an I/O submission queue coalescing timer (SQT) meets a second threshold.

When waiting duration of any to-be-sent simultaneously send, to the NVMe controller as the payload data of the same PCIe packet, a to-be-sent SQE whose waiting duration is greater than or equal to the second threshold. For example, when waiting duration of two SQEs (the SQE 1 and the SQE 2) in the I/O submission queue 1 each is 60 s at a current moment, and the second threshold is 50 s, the host may send the SQE 1 and the SQE 2 to the NVMe controller as the payload data of the same PCIe packet.

Further, when a PCIe packet sent by the host to the NVMe controller includes a plurality of SQEs, the host arranges the plurality of to-be-coalesced SQEs in a sequence of receiving the data operation requests in step S310, and jointly uses the plurality of SQEs as the payload data of the PCIe packet. Therefore, it is ensured that, when receiving the PCIe packet, the NVMe controller may store the PCIe packet in the target I/O submission queue in the sequence of receiving the data operation requests, and then obtain and perform each SQE.

S312. The host sends the first PCIe packet to the NVMe controller, where the first PCIe packet includes entrance information of the target I/O submission queue and at least one SQE.

The host and the NVMe controller communicate with each other based on the PCIe bus. The first PCIe packet is a TLP. The host may send one or more SQEs to the NVMe controller in a push manner using a same PCIe packet.

It is worthwhile to note that, in addition to a PCIe address structure shown in FIG. 4A, a PCIe packet used for communication between the host and the NVMe controller further includes an NVMe packet header and payload data (not shown in FIG. 4). The NVMe packet header is used to record a field added when the packet is processed at an NVMe protocol layer, and the payload data is used to carry one or more SQEs.

In a possible embodiment, the host may learn of a maximum quantity of slots in each I/O submission queue. For example, the host periodically learns of the maximum quantity of slots in each I/O submission queue and a quantity of available slots from the NVMe controller using a query request. A counter configured to count a quantity of sent SQEs is added to the host, and the counter is configured to record a quantity of SQEs that are of each I/O submission queue and that are sent by the host to the NVMe controller. There may be one or more counters. When there is only one counter, the counter is configured to record a quantity of to-be-executed SQEs that are of each of all I/O submission queues and that are sent by the host in the storage system. When there are a plurality of counters, each counter may be configured to record a quantity of SQEs that are each of one or more I/O submission queues and that have been sent by the host. For a same I/O submission queue, when a quantity, recorded in the counter, of SQEs that have been sent by the host reaches a maximum quantity of slots in the I/O submission queue, the host may send the query request to the NVMe controller, to determine whether the I/O submission queue includes a vacant slot at the current moment, in other words, to determine whether the NVMe controller has read the SQE in the I/O submission queue. When receiving a response that is returned by the NVMe controller and that indicates that the I/O submission queue includes the vacant slot, the host sends, to the NVMe controller, a PCIe packet carrying a new SQE. Therefore, this avoids a storage failure caused when a quantity of SQEs continuously sent by the host exceeds a quantity of vacant slots in the I/O submission queue.

According to the foregoing flow control method, the counter configured to count the quantity of SQEs sent on a side of the host may record and control a quantity of SQEs sent by the host to the NVMe controller, to implement flow control on a data processing process performed by the NVMe controller, to avoid a storage failure caused in the NVMe controller because the host frequently sends a relatively large quantity of SQEs, and improve an SQE storage success rate.

S313. The NVMe controller stores the SQE of the first PCIe packet in the target I/O submission queue based on the entrance information of the target I/O submission queue.

When receiving the first PCIe packet, the NVMe controller may determine information about an address of the target I/O submission queue in the memory of the NVMe controller based on the entrance information of the target I/O submission queue, and then store the at least one SQE of the first PCIe packet in the target I/O submission queue based on the information about the address of the target I/O submission queue in the memory of the NVMe controller. For example, the SQE may be stored based on operation steps in step S3131 to step 3133.

S3131. The NVMe controller determines an identifier of the target I/O submission queue based on the entrance information of the target I/O submission queue.

The NVMe controller determines the identifier of the target I/O submission queue based on the entrance information of the target I/O submission queue in the PCIe address structure in the first PCIe packet. For example, the identifier of the target I/O submission queue is calculated using the following formula 1:

$$\text{the identifier of the target I/O submission queue} = \frac{ADD_{11} - ADD_{12}}{MCS \times 64}. \quad (1)$$

Herein, $ADD_{11}$ is the first PCIe address of the target I/O submission queue, and $ADD_{12}$ is a start address that is of consecutive address spaces allocated from the addressable PCIe address space of the host and that is used to identify each I/O submission queue. For example, as shown in FIG. 4A, $ADD_{12}$ is the start address of the first address space. The identifier of the target I/O submission queue may be determined using the foregoing formula 1. For example, if the first PCIe address of the target I/O submission queue is (base 1+MCS×64×2), the start address of the first address space is the base 1, and therefore the target I/O submission queue has an identifier 2 through calculation using the formula 1.

S3132. The NVMe controller determines a quantity of SQEs in the first PCIe packet based on a size of the payload data in the first PCIe packet, and determines a storage location of the SQE in the target I/O submission queue.

After receiving the first PCIe packet, the NVMe controller first parses content of the first PCIe packet to obtain the payload data of the first PCIe packet; and then calculates the quantity of SQEs carried in the payload data. The NVMe controller may calculate the quantity of SQEs according to the following formula 2:

Quantity of SQEs=Size of the payload data of the first PCIe packet/64      (2).

After determining the quantity of SQEs carried in the first PCIe packet, the NVMe controller further needs to determine the storage location of the SQE, in other words, determine an SQE storage slot in the target I/O submission queue based on the identifier of the target I/O submission queue. For example, the NVMe controller records information about a location of each I/O submission queue in the second memory. In addition, the NVMe controller may determine a location of a next available slot based on location information indicated by a tail pointer of the target I/O submission queue at the current moment, and further store, in the target I/O submission queue, the at least one SQE carried in the first PCIe packet.

S3133. The NVMe controller separately stores the at least one SQE in the target I/O submission queue based on the determined storage location of the target I/O submission queue.

When determining the identifier of the target I/O submission queue and the quantity of SQEs in the first PCIe packet, the NVMe controller may successively store the SQEs in vacant slots in a preset sequence based on a location indicated by the tail pointer of the target I/O submission queue.

Further, the NVMe controller may simultaneously store the SQEs in a same I/O submission queue in a plurality of threads or processes. When the at least one SQE is stored in a slot in the target I/O submission queue, a lock operation needs to be performed to avoid data inconsistency caused by a plurality of SQE writing operations performed on a same slot. In the conventional technical solution, a range of lock operations includes: reserving a slot in an I/O submission queue, copying an SQE to the slot in the I/O submission queue, updating a tail doorbell register of the submission queue, and finally releasing a write permission of the I/O submission queue. However, in this embodiment of this application, the SQE is sent to the NVMe controller in a push manner, and a doorbell mechanism is cancelled. Therefore, there is no need to perform all operations in the range of the lock operations, and the range of the lock operations include only a process in which the NVMe controller reserves a slot in an I/O submission queue. This narrows the range of the lock operations and reduces time of the lock operations.

By performing step S3131 to step S3133, the NVMe controller may store the at least one SQE in the target I/O submission queue based on the entrance information of the I/O submission queue in the PCIe packet. The host and the NVMe controller do not need to communicate with each other using the doorbell mechanism, and this reduces complexity of an NVMe data processing process. In addition, the host may push a plurality of SQEs once in a coalescing manner using a same PCIe packet, and this reduces a quantity of communication messages between the host and the NVMe controller, and improves data processing efficiency. In addition, the host may directly read the data operation request from the memory in the host, and this further improves the data processing efficiency. Further, in this embodiment of the present application, the range of the lock operations in the data processing process is further simplified, and the NVMe controller only needs to lock a process of storing an SQE in a determined vacant slot. This resolves a problem that a conventional lock processing process is complex and time-consuming, and reduces lock duration and data processing duration.

In a possible embodiment, in addition to using a segment of consecutive first address spaces shown in FIG. 4A to allocate PCIe addresses to a plurality of I/O submission queues, the host may also use several inconsecutive storage spaces in the base address register to represent a mapping relationship between an address allocated to each I/O submission queue and an identifier of the I/O submission queue. The host and the NVMe controller each record the mapping relationship between an address allocated to each I/O submission queue and an identifier of the I/O submission queue, and the host may send the first PCIe packet to the NVMe controller based on the mapping relationship. The first PCIe packet includes a PCIe address allocated by the host to the target I/O submission queue, and the PCIe address is used as the entrance information of the target I/O submission queue. In this case, the NVMe controller may parse the first PCIe packet to obtain a PCIe address field allocated by the host to the target I/O submission queue; then determine, based on the mapping relationship, an identifier of an I/O submission queue corresponding to the PCIe address field; determine a storage location of the I/O submission queue in the memory of the NVMe controller based on the identifier of the I/O submission queue; and store the at least one SQE of the first PCIe packet in the target I/O submission queue. In this way, a process in which the NVMe controller stores the at least one SQE based on the entrance information of the target I/O submission queue is completed. In the foregoing process, a doorbell mechanism in a conventional technology can also be cancelled, and a data processing process is simplified. In addition, the host may send, in a push manner using a same PCIe packet, a plurality of SQEs to the NVMe controller in an SQE coalescing manner in the method shown in FIG. 3A, FIG. 3B, and FIG. 3C. This reduces a quantity of message packets between the host and the NVMe controller, and improves data processing efficiency.

In another possible embodiment, the addressable PCIe address space of the host includes an address space of the memory in the host and an addressable address space of a PCIe base address register in the host. In addition to using address in the address space of the base address register to map identifiers of all I/O submission queues in the foregoing step, addresses in the address space of the memory in the host may also be used to allocate PCIE addresses to all the I/O submission queues in this embodiment of the present application. The identifier of each I/O submission queue corresponds to a unique PCIe address. In this case, the host stores a mapping relationship between an address in the address space of the memory and an identifier of an I/O submission queue. The host may send, to the NVMe controller based on the mapping relationship, a PCIe packet that carries at least one SQE. Alternatively, the NVMe controller may determine, based on the mapping relationship and a mapping address carried in the PCIe packet, an identifier of an I/O submission queue corresponding to the mapping address; determine a storage location of the I/O submission queue in the NVMe controller based on the identifier of the I/O submission queue; and further store the at least one SQE in the target I/O submission queue. According to the foregoing method, a doorbell mechanism in a conventional technology can also be cancelled, and a data processing process is simplified. In addition, the host sends, in an SQE coalescing manner shown in FIG. 3A, FIG. 3B, and FIG. 3C, a plurality of SQEs to the NVMe controller using a same PCIe packet. This reduces a quantity of message packets between the host and the NVMe controller, and improves data processing efficiency.

In another possible embodiment, in addition to identifying the I/O submission queue according to a PCIe protocol using a PCIe address, the host and the NVMe controller may also transmit the identifier of the target I/O submission queue to the NVMe controller based on a pre-agreement using a specified field in a PCIe packet or a part of payload data. Then the NVMe controller parses the PCIe packet to obtain the foregoing specified field (for example, a reserved field in the PCIe packet or a start bit of the payload data), and determines, based on the pre-agreement, the identifier of the I/O submission queue indicated by the specified field. Therefore, a doorbell mechanism in a conventional technology can also be cancelled, and a data processing process is simplified.

The following further describes a process in which the NVMe controller obtains and executes a data operation request in an SQE after storing the SQE in the target I/O submission queue, and sends an operation result of the data operation request to the host based on entrance information of an I/O completion queue.

S314. The NVMe controller reads and executes the data operation request in the SQE, and generates the operation result.

After storing the at least one SQE in the target I/O submission queue, the NVMe controller may successively read data operation requests in SQEs, execute the data operation requests, and generate operation results. Optionally, the operation result includes an identifier of the I/O submission queue and the operation result of the data operation request.

S315. (Optional) When a CQE coalescing condition is met, use at least two operation results as payload data of a second PCIe packet.

In this embodiment of the present application, the memory in the host still stores data in the I/O completion queue. A process of creating an I/O completion queue does not constitute a limitation on this embodiment of the present application.

One CQE corresponds to one operation result, and each operation result is used to indicate an operation result of a data operation request in one CQE. Similar to step S311 in which the host coalesces a plurality of SQEs, after processing data operation requests of the plurality of SQEs, the NVMe controller sends at least one operation result to the host based on the entrance information of the I/O completion queue. Then, the host stores the operation result in a target I/O completion queue based on the entrance information of the I/O completion queue.

The CQE coalescing condition includes at least one of the following conditions:

Condition 1: A maximum CQE coalesced block (MCCB) size meets a third threshold.

When a size of N to-be-sent CQEs in one I/O completion queue is greater than or equal to the third threshold at a current moment, the NVMe controller may simultaneously use the N CQEs as payload data of a same PCIe packet and send the payload data to the host, where N is greater than or equal to 2. For example, when three CQEs (a CQE 1, a CQE 2, and a CQE 3) in an I/O completion queue 1 each are in a to-be-sent state at the current moment, a size of the three CQEs is 190 bytes, and the third threshold is 180 bytes, the NVMe controller may simultaneously send the three CQEs to the host as the payload data of the same PCIe packet.

Condition 2: Duration recorded by an I/O completion queue coalescing timer (CQT) meets a fourth threshold.

When waiting duration of any to-be-sent CQE in an I/O completion queue is greater than or equal to the fourth threshold, the NVMe controller may simultaneously send, to the host as the payload data of the same PCIe packet, at least two CQEs whose waiting duration is greater than or equal to the fourth threshold. For example, when sending waiting duration of two CQEs (the CQE 1 and the CQE 2) in the I/O completion queue 1 reaches 60 s at a current moment, and the fourth threshold is 45 s, the NVMe controller may send the two CQEs to the host as the payload data of the same PCIe packet.

S316. The NVMe controller sends the second PCIe packet to the host, where the second PCIe packet carries entrance information of the target I/O completion queue and at least one CQE.

Each I/O submission queue corresponds to one I/O completion queue. The NVMe controller stores a correspondence between an I/O submission queue and an I/O completion queue. The NVMe controller may determine, based on the correspondence between an I/O submission queue and an I/O completion queue, the target I/O completion queue corresponding to the target I/O submission queue. For example, the NVMe controller determines a PCIe address of the target I/O completion queue, and then sends, to the host, the second PCIe packet that carries the entrance information of the target I/O completion queue and the at least one CQE.

Figure 4B:
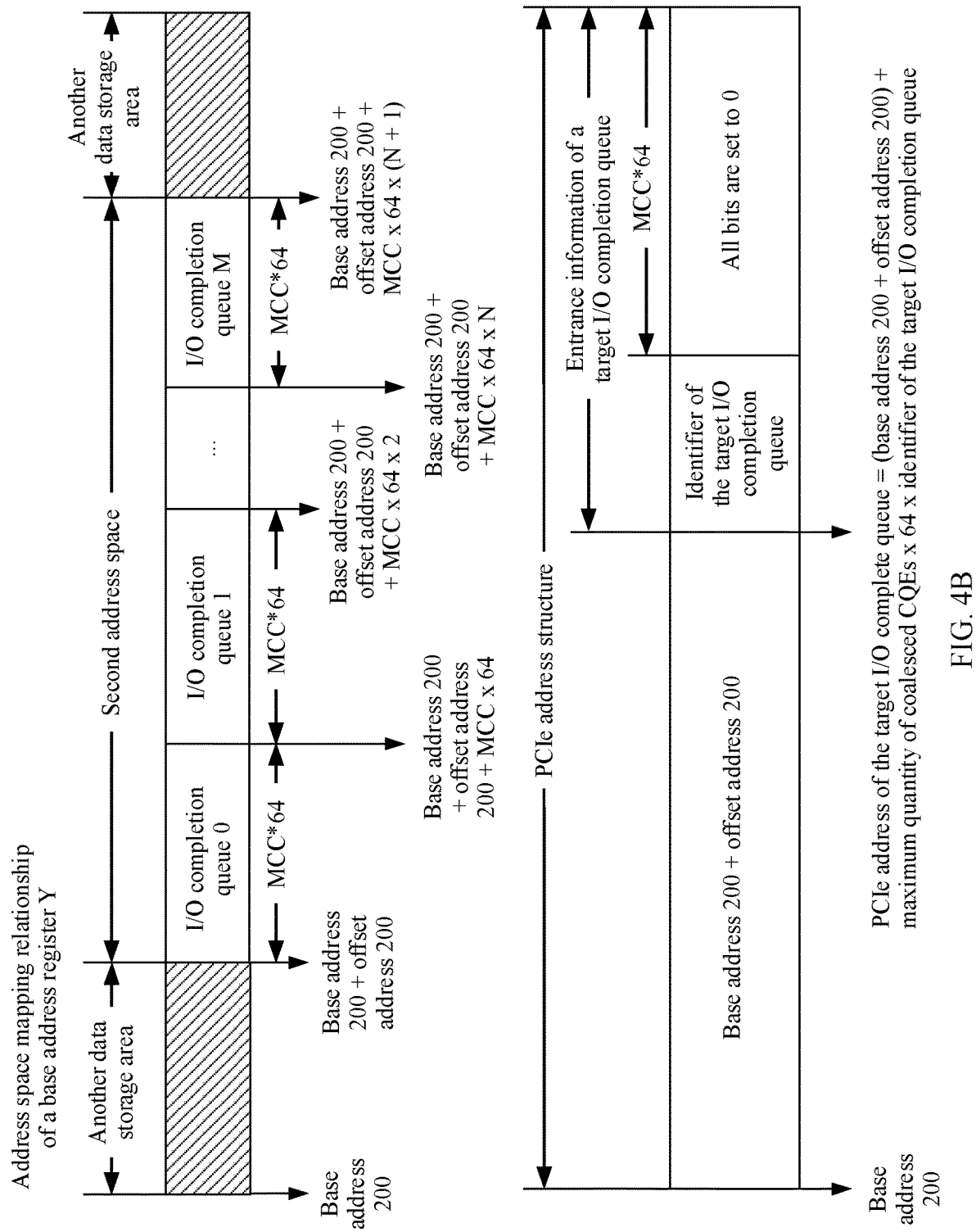
FIG. 4B is a schematic diagram in which a host allocates a PCIe address to an I/O completion queue in an address space of a base address register according to an embodiment of the present application.

FIG. 4B is a schematic diagram in which a host allocates a PCIe address to an I/O completion queue in an address space of a base address register according to an embodiment of the present application. As shown in the figure, a base address register Y is an addressable address space of the host, and a base address of the base address register Y is a base address 200. The host groups a segment of consecutive address spaces into a second address space, and then allocates PCIe addresses to a plurality of I/O completion queues in the second address space. The host allocates a unique PCIe address to each I/O completion queue. A start address of the second address space is (base address 200+offset address 200). A process in which the host allocates a PCIe address to each I/O completion queue may also be understood as that the host maps a segment of consecutive addresses in the base address register to the I/O completion queue. For example, a segment of consecutive addresses from (base address 200+offset address 200) to (base address 200+offset address 200+MCC×64) in the base address register Y are allocated to an I/O completion queue 0. In this case, a PCIe address of the I/O completion queue 0 is (base address 200+offset address 200). A segment of consecutive addresses from (base address 200+offset address 200+ MCC×64) to (base address 200+offset address 200+MCC × 64×2) in the base address register Y are allocated to the I/O completion queue 1. In this case, a PCIe address of the I/O completion queue 1 is (base address 200+offset address 200+MCC×1). By analogy, a segment of consecutive addresses from (base address 200+offset address 200+ MCC×64×M) to (base address 200+offset address 200+ MCC×64×(M+1)) in the base address register Y are allocated to an I/O completion queue M. In this case, a PCIe address of the I/O completion queue M is (base address 200+offset address 200+MCC×64×M).

It is worthwhile to note that the second address space in FIG. 4B is a segment of address spaces in the base address register Y, and the start address of the second address space may be the base address of the base address register Y, or may be (base address+offset address) in the base address register. The following embodiments of the present application are described using an example in which the start address of the second address space shown in FIG. 4B is (base address+offset address).

For ease of subsequent description, in the following description of this embodiment of the present application, a PCIe address of the target I/O completion queue is marked as a second PCIe address. The second PCIe address of the target I/O completion queue may be expressed as follows:

PCIe address of the target I/O completion queue=
(base address of a BAR+offset address)+MCC×
64×identifier of the target I/O completion
queue.

Optionally, after creating an I/O completion queue, the host may notify the NVMe controller of a PICe address allocated to an identifier of each I/O completion queue, and the NVMe controller stores a mapping relationship between an identifier of an I/O completion queue and a PCIe address allocated to the I/O completion queue.

It is worthwhile to note that, in addition to the PCIe address structure shown in FIG. 4B, a PCIe packet used for communication between the host and the NVMe controller further includes an NVMe packet header and payload data (not shown in FIG. 4B). The NVMe packet header is used to record a field added when the packet is processed using an NVMe protocol layer, and the payload data is used to carry one or more SQE requests.

S317. The host stores the at least one CQE in the target I/O completion queue based on the entrance information of the identifier of the target I/O completion queue.

The host obtains and parses the second PCIe packet; determines information about an address of the target I/O completion queue in the memory of the host based on the entrance information of the target I/O completion queue; and then stores the at least one CQE in the target I/O completion queue. For a process, refer to the following step S3171 to step S3173.

S3171. The host determines the identifier of the target I/O completion queue based on the entrance information of the target I/O completion queue.

For example, the entrance identifier of the target I/O completion queue is calculated using the following formula 3:

$$\text{the identifier of the target I/O completion queue} = \frac{ADD_{21} - ADD_{22}}{MCC \times 64}. \quad (3)$$

Herein, $ADD_{21}$ is the second PCIe address of the target I/O completion queue, and $ADD_{22}$ is a start address that is of consecutive address spaces allocated from the addressable PCIe address space of the host and that is used to identify each I/O completion queue, for example, the start address of the second address space in FIG. 4B.

For example, if the PCIe address of the target I/O completion queue is (base 21+offset 21+MCC×64×2), and the start address of the address PCIe of the target I/O completion queue is (base 21+offset 21), and therefore the target I/O completion queue has an identifier 2 through calculation according to the formula 3. Through calculation using the formula 3, the NVMe controller may determine the identifier of the target I/O completion queue.

S3172. The host determines a quantity of CQEs based on a size of the payload data of the second PCIe packet, and determines a storage location of the CQE in the target I/O completion queue.

S3173. The host stores the at least one CQE in the target I/O completion queue based on the determined storage location in the target I/O completion queue.

After receiving the second PCIe packet, the host parses content of the packet to obtain the payload data of the second PCIe packet, and calculates the quantity of CQEs carried in the payload data. For example, the quantity of CQEs may be calculated according to the following formula 4:

Quantity of CQEs=Size of the payload data in the
second PCIe packet/64 (4).

After determining the quantity of CQEs carried in the second PCIe packet, the host further needs to determine the storage location of the CQE, in other words, determine a CQE storage slot in the target I/O completion queue. For example, the host records information about a location of each I/O completion queue in the first memory. In addition, the host may determine a location of a next available slot based on location information indicated by a tail pointer of the target I/O completion queue at the current moment, and further store, in the target I/O completion queue, the at least one CQE carried in the second PCIe packet.

According to the description of the foregoing process, the host may store a data operation request in the target I/O submission queue based on entrance information of an I/O submission queue, and the NVMe controller may directly store, in the target I/O submission queue using the entrance identifier of the target I/O submission queue in the PCIe address structure, one or more SQEs carried in a same PCIe packet. Similarly, the NVMe controller may also store an operation result of the data operation request in the target I/O completion queue based on entrance information of an I/O completion queue. Compared with a conventional data processing process, in the technical solution provided in this application, the doorbell and interrupt mechanisms are cancelled, and the SQE and the CQE are stored based on the entrance information. This simplifies a data processing process. In addition, the host or the NVMe controller may jointly use a plurality of packets as PCIe payload data in a coalescing manner, and the host or the NVMe controller can push a plurality of data operation requests or operation results once, to reduce a quantity of communication packets between the host and the NVMe controller, and improve efficiency of communication between the host and the NVMe controller. In addition, in this embodiment of this application, a lock range in which the NVMe controller stores an SQE in the target I/O completion queue is simplified, a conventional NVMe data processing process is further simplified, and lock duration and data processing duration are reduced. It should be understood that, in various embodiments of the present application, sequence numbers of the foregoing processes do not mean execution sequences. The execution sequences of the processes should be determined based on functions and internal logic of the processes, and shall not constitute any limitation on the implementation processes of the embodiments of the present application.

In a possible embodiment, in addition to using a segment of consecutive first address spaces shown in FIG. 4B to allocate PCIe addresses to a plurality of I/O completion queues, the host may also use several inconsecutive storage spaces in the base address register to represent all I/O completion queues. In this case, the host and the NVMe controller each record a mapping relationship between an address allocated to each I/O completion queue and an identifier of the I/O completion queue, and the NVMe controller may send the second PCIe packet to the host based on the mapping relationship. The second PCIe packet includes a PCIe address allocated by the host to the target I/O completion queue, and the PCIe address is used as the entrance information of the target I/O completion queue. Therefore, the host may parse the second PCIe packet to obtain a PCIe address field allocated to the target I/O submission queue; then determine, based on the mapping relationship, an identifier of an I/O completion queue corresponding to the PCIe address field; and store the at least one CQE of the second PCIe packet in the target I/O completion queue based on the identifier of the I/O completion queue. In this way, a process in which the host stores the at least one CQE based on the entrance information of the target I/O completion queue is completed. In the foregoing process, an interrupt mechanism in a conventional technology can also be cancelled, and a data processing process is simplified. In addition, the NVMe controller may send, in a push manner using a same PCIe packet, a plurality of CQEs to the host in a CQE coalescing manner in the method shown in FIG. 3A, FIG. 3B, and FIG. 3C. This reduces a quantity of message packets between the host and the NVMe controller, and improves data processing efficiency.

In another possible embodiment, the addressable PCIe address space of the host includes an address space of the memory in the host and an address space of a PCIe base address register in the host. In addition to using address in the address space of the base address register to map identifiers of all I/O completion queues in the foregoing step, addresses in the address space of the memory in the host may also be used to identify all the I/O completion queues in this embodiment of the present application. The identifier of each I/O completion queue corresponds to a unique address. In this case, the host and the NVMe controller each store a mapping relationship between an address in the address space of the memory and an identifier of an I/O completion queue. The NVMe controller may send, to the host based on the mapping relationship, a PCIe packet that carries at least one CQE. Alternatively, the host may determine, based on the mapping relationship and a mapping address carried in the PCIe packet, an identifier of an I/O completion queue corresponding to the mapping address, and further store the at least one CQE in the target I/O completion queue. According to the foregoing method, an interrupt mechanism in a conventional technology can also be cancelled, and a data processing process is simplified. In addition, the NVMe controller may send, in a CQE coalescing manner shown in FIG. 3A, FIG. 3B, and FIG. 3C, a plurality of CQEs to the host using a same PCIe packet. This reduces a quantity of message packets between the host and the NVMe controller, and improves data processing efficiency.

In another possible implementation, in addition to identifying the target I/O completion queue according to a PCIe standard using an address, the NVMe controller may also transmit the identifier of the target I/O completion queue to the host based on a pre-agreement using a specified field in a PCIe packet or a part of payload data. Then the host parses, based on the pre-agreement, the PCIe packet using the foregoing specified field (for example, a reserved field in the PCIe packet or a start bit of the payload data), to obtain the identifier of the target I/O completion queue carried in the PCIe packet, and stores an operation result in the I/O completion queue.

In another possible implementation, the host records a correspondence between an I/O submission queue and an I/O completion queue. Correspondingly, in step S316, the second PCIe packet may also directly carry the identifier of the target I/O submission queue. After receiving the second PCIe packet, the host may obtain the identifier of the target I/O submission queue, then determine the target I/O completion queue based on the correspondence between an I/O submission queue and an I/O completion queue; and store, in the target I/O completion queue, the at least one CQE carried in the second PCIe packet.

In another possible implementation, a technical solution of storing the SQE based on the entrance information of the I/O submission queue in step S310 to step S313 and a technical solution of storing the CQE based on the entrance information of the I/O completion queue in step S314 to step S317 may be used in combination with the doorbell mechanism and the interrupt mechanism in other approaches. For example, when sending the SQE to the NVMe controller, the host may use the technical solution of storing the SQE based on the entrance information of the I/O submission queue in step S310 to step S313. The NVMe controller still sends the CQE to the host using an interrupt mechanism in a conventional technical solution. The NVMe controller sends an interrupt signal to the host, and then sends the CQE to the host in a direct memory access (DMA) write manner; and the host stores the CQE in the target I/O completion queue. Alternatively, the host sends the SQE to the NVMe controller in a conventional doorbell mechanism; and the NVMe controller sends the CQE to the host using the technical solution of storing the CQE based on the entrance information of the I/O completion queue in step S314 to step S317. The foregoing method can also simplify a data processing process to some extent, and improve data processing efficiency.

It is worthwhile to note that, to make the description brief, the foregoing method embodiments are expressed as a series of actions. However, a person skilled in the art should appreciate that the present application is not limited to the described action sequence. In addition, a person skilled in the art should also appreciate that all the embodiments described in this specification are example embodiments, and the related actions are not necessarily mandatory to the present application.

Another appropriate step combination that a person skilled in the art can think of based on the content described above also falls within the protection scope of the present application. In addition, a person skilled in the art should also appreciate that all the embodiments described in this specification are example embodiments, and the related actions are not necessarily mandatory to the present application.

Figure 5:
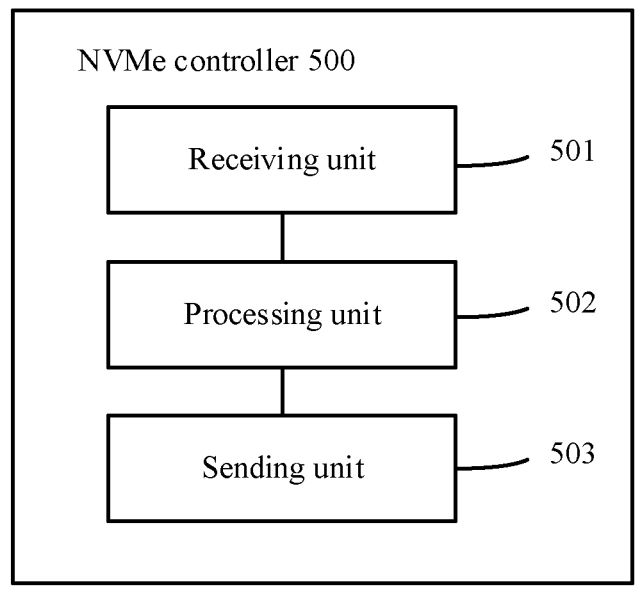
FIG. 5 is a schematic structural diagram of an NVMe controller according to an embodiment of the present application.
Figure 6:
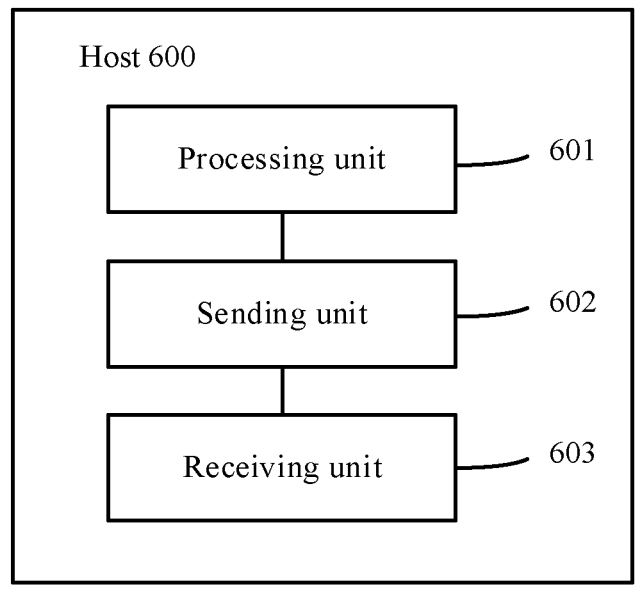
FIG. 6 is a schematic structural diagram of a host according to an embodiment of the present application.
Figure 7:
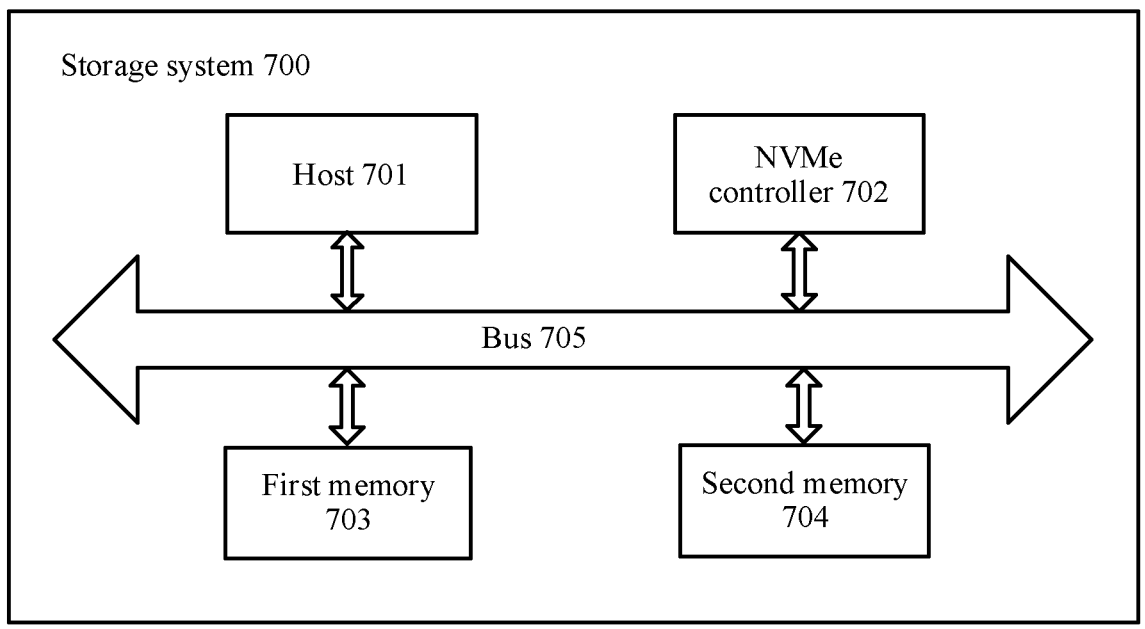
FIG. 7 is a schematic structural diagram of a storage system according to an embodiment of the present application.

With reference to FIG. 1 to FIG. 4B, the foregoing describes in detail the data processing methods according to the embodiments of the present application. With reference to FIG. 5 to FIG. 7, the following describes an NVMe controller, a host, and a storage system for data processing according to embodiments of the present application.

FIG. 5 is a schematic structural diagram of an NVMe controller 500 according to an embodiment of the present application. As shown in the figure, the NVMe controller 500 includes a receiving unit 501 and a processing unit 502.

The receiving unit 501 is configured to receive a first PCIe packet sent by the host. A memory in the NVMe controller 500 is provided with at least one I/O submission queue. The first PCIe packet includes entrance information of a target I/O submission queue and at least one SQE. One SQE corresponds to one data operation request, and each data operation request is used to perform a read or write operation on a storage medium managed by the NVMe controller 500.

The processing unit 502 is configured to store the at least one SQE in the target I/O submission queue based on the entrance information of the target I/O submission queue.

Optionally, the entrance information of the target I/O submission queue is a unique first PCIe address in an addressable PCIe address space of the host. The processing unit 502 is further configured to: determine a second address based on the first PCIe address, where the second address is an address at which the target I/O submission queue is stored in the memory of the NVMe controller 500; and store the at least one SQE in the target I/O submission queue based on the second address.

Optionally, the processing unit 502 is further configured to: determine an identifier of the target I/O submission queue based on the first PCIe address of the target I/O submission queue; and determine the second address based on the identifier of the target I/O submission queue.

Optionally, the processing unit 502 is further configured to calculate the identifier of the target I/O submission queue according to the following formula:

the identifier of the target I/O submission queue $= \frac{ADD_{11} - ADD_{21}}{MCS \times 64}$.

Herein, $ADD_{11}$ is the first PCIe address of the target I/O submission queue, $ADD_{21}$ is a start address that is of consecutive address spaces allocated from the addressable PCIe address space of the host and that is used to identify each I/O submission queue, and the MCS is a maximum quantity of coalesced SQEs in each I/O submission queue.

Optionally, the processing unit 502 is further configured such that before the receiving unit 501 receives a creation instruction of the host, the processing unit 502 negotiates the maximum quantity of coalesced SQEs in each I/O submission queue with the host. The MCS obtained through negotiation is a smaller value of a maximum quantity of coalesced SQEs in each I/O submission queue supported by the NVMe controller 500 and a maximum quantity of coalesced SQEs in each I/O submission queue supported by the host.

Optionally, the first PCIe packet further includes depth information M of the target I/O submission queue, M indicates a quantity of SQEs carried in the first PCIe packet, and 1≤M≤MCS. The processing unit 502 is further configured to: determine a preset sequence of M SQEs; and store the M SQEs of the target I/O submission queue in the preset sequence of the M SQEs.

Optionally, a memory in the host is provided with at least one I/O completion queue, and the NVMe controller 500 further includes a sending unit 503.

The processing unit 502 is further configured to: obtain the at least one SQE from the target I/O submission queue; and perform, based on the data operation request carried in the at least one SQE, a read or write operation on a storage medium managed by the NVMe controller 500.

The sending unit 503 is configured to send a second PCIe packet to the host. The second PCIe packet includes entrance information of a target I/O completion queue and at least one CQE, and each CQE is an operation result of the data operation request that is carried in each SQE and that is executed by the NVMe controller 500.

Optionally, the processing unit 502 is further configured such that when a CQE coalescing condition is met, the NVMe controller 500 uses operation results of at least two data operation requests as payload data of the second PCIe packet. One CQE corresponds to an operation result of one data operation request. The CQE coalescing condition includes: a maximum coalesced CQE block (MCCB) size meets a first threshold, or a time recorded by an I/O completion queue coalescing timer meets a second threshold.

Optionally, the second PCIe packet further includes depth information N of the target I/O completion queue, and N indicates a quantity of CQEs carried in the second PCIe packet. The processing unit 502 is further configured to use N CQEs as the payload data of the second PCIe packet in a preset sequence, where 1≤N≤MCC, and where the MCC is a positive integer.

Optionally, the host is an embedded processor, and the embedded processor can send a PCIe packet with a capacity of at least 64 bytes.

It should be understood that the NVMe controller 500 in this embodiment of the present application may be implemented using an application-specific integrated circuit (ASIC) or a programmable logic device (PLD). The PLD may be a complex programmable logic device (CPLD), a field-programmable gate array (FPGA), generic array logic (GAL), or any combination thereof. When the data processing method shown in FIG. 2 and the data processing method shown in FIG. 3A, FIG. 3B, and FIG. 3C are implemented using software, the NVMe controller 500 and all modules of the NVMe controller 500 may also be software modules.

The NVMe controller 500 according to this embodiment of the present application may correspondingly perform the methods described in the embodiments of the present application. In addition, the foregoing and other operations and/or functions of the units in the NVMe controller 500 are respectively intended to implement corresponding procedures performed by the NVMe controller in the method in FIG. 2 and the method in FIG. 3A, FIG. 3B, and FIG. 3C. For brevity, details are not described herein again.

FIG. 6 is a schematic structural diagram of a host 600 according to an embodiment of the present application. As shown in the figure, the host 600 includes a processing unit 601, a sending unit 602, and a receiving unit 603.

The processing unit 601 is configured to determine entrance information of a target I/O submission queue based on an identifier of the target I/O submission queue of a to-be-sent data operation request. A memory in the host 600 is provided with at least one I/O submission queue.

The sending unit 602 is configured to send a first PCIe packet to an NVMe controller. The first PCIe packet includes the entrance information of the target I/O submission queue and at least one SQE, where one SQE corresponds to one data operation request, and where each data operation request is used to perform a read or write operation on a storage medium managed by the NVMe controller.

Optionally, the processing unit 601 is further configured to: allocate a unique first PCIe address in an addressable PCIe address space of the host 600 to each I/O submission queue; determine a first PCIe address of the target I/O submission queue based on an identifier of the target I/O submission queue; and use the first PCIe address of the target I/O submission queue as the entrance information of the target I/O submission queue.

Optionally, the sending unit 602 is further configured to send a creation instruction to the NVMe controller. The creation instruction is used to instruct the NVMe controller to set the at least one I/O submission queue in the memory of the NVMe controller, and record an association relationship between an identifier of each I/O submission queue and a first PCIe address of each I/O submission queue.

Optionally, before the sending unit 602 sends the creation instruction to the NVMe controller, the processing unit 601 negotiates a maximum quantity of coalesced SQEs (MCS) in each I/O submission queue with the NVMe controller. The MCS obtained through negotiation is a smaller value of a maximum quantity of coalesced SQEs in each I/O submission queue supported by the NVMe controller and a maximum quantity of coalesced SQEs in each I/O submission queue supported by the host 600.

Optionally, the first PCIe packet further includes depth information M of the target I/O submission queue, where M indicates a quantity of SQEs carried in the first PCIe packet, and where 1≤M≤MCS.

Optionally, the processing unit 601 is further configured such that when an SQE coalescing condition is met, the host 600 uses at least two data operation requests as payload data of the first PCIe packet. One data operation request corresponds to one SQE, and each data operation request is used to perform the read or write operation on the storage medium managed by the NVMe controller. The SQE coalescing condition includes: a maximum coalesced SQE block (MCSB) size meets a third threshold, or a duration recorded by an I/O submission queue coalescing timer meets a fourth threshold.

Optionally, the host 600 further includes the receiving unit 603 is configured to receive a second PCIe packet sent by the NVMe controller. The second PCIe packet includes entrance information of a target I/O completion queue and at least one CQE, and each CQE is an operation result of the data operation request that is carried in each SQE and that is executed by the NVMe controller.

The processing unit 601 is further configured to store the at least one CQE in the target I/O completion queue based on the entrance information of the target I/O completion queue.

Optionally, the entrance information of the target I/O completion queue is a unique second PCIe address in the addressable PCIe address space of the host 600.

The processing unit 601 is further configured to: determine a third address based on the second PCIe address, where the third address is an address at which the target I/O completion queue is stored in a memory of the host 600; and store the at least one CQE in the target I/O completion queue based on the third address.

Optionally, that the processing unit 601 determines a third address based on the second PCIe address includes: determining an identifier of the target I/O completion queue based on the second PCIe address; and determining the third address based on the identifier of the target I/O completion queue.

Optionally, the processing unit 601 is further configured to calculate the identifier of the target I/O completion queue according to the following formula:

$$\text{the identifier of the target I/O completion queue} = \frac{ADD_{12} - ADD_{22}}{MCC \times 64}.$$

Herein, $ADD_{12}$ is the second PCIe address of the target I/O completion queue, $ADD_{22}$ is a start address that is of consecutive address spaces allocated from the addressable PCIe address space of the host 600 and that is used to identify each I/O completion queue, and the MCC is a maximum quantity of coalesced CQEs in each I/O completion queue.

The processing unit 601 is further configured to store the at least one CQE in the memory of the host 600 based on the identifier of the target I/O completion queue.

Optionally, the host 600 is an embedded processor, and the embedded processor can send a PCIe packet with a capacity of at least 64 bytes.

It should be understood that the host 600 in this embodiment of the present application may be implemented using an application-specific integrated circuit (ASIC) or a programmable logic device (PLD). The PLD may be a complex programmable logic device (CPLD), a field-programmable gate array (FPGA), generic array logic (GAL), or any combination thereof. When the data processing method shown in FIG. 2 and the data processing method shown in FIG. 3A, FIG. 3B, and FIG. 3C are implemented using software, the host 600 and all modules of the host 600 may also be software modules.

The host 600 according to this embodiment of the present application may correspondingly perform the methods described in the embodiments of the present application. In addition, the foregoing and other operations and/or functions of the units in the host 600 are respectively intended to implement corresponding procedures performed by the host in the method in FIG. 2 and the method in FIG. 3A, FIG. 3B, and FIG. 3C. For brevity, details are not described herein again.

FIG. 7 is a schematic diagram of a storage system 700 according to an embodiment of the present application. As shown in the figure, the storage system 700 includes a host 701, an NVMe controller 702, a first memory 703, a second memory 704, and a bus 705. The host 701, the NVMe controller 702, the first memory 703, and the second memory 704 communicate with each other using the bus 705, or may communicate with each other through wireless transmission or the like. The first memory 703 is used by the host 701 to store data in an I/O completion queue. The second memory 704 is used by the NVMe controller 702 to store data in an I/O submission queue.

The host 701 is configured to send a first PCIe packet to the NVMe controller 702. The first PCIe packet includes entrance information of a target I/O submission queue and at least one SQE.

The NVMe controller 702 is configured to: receive the first PCIe packet sent by the host 701; and store the at least one SQE in the target I/O submission queue based on the entrance information of the target I/O submission queue. The second memory 704 in the NVMe controller 702 is provided with at least one I/O submission queue.

Optionally, the host 701 is further configured to allocate a unique first PCIe address in an addressable PCIe address space of the host 701 to each I/O submission queue. The entrance information of the target I/O submission queue is a first PCIe address of the target I/O submission queue.

The NVMe controller 702 is further configured to: determine a second address based on the first PCIe address, where the second address is an address at which the target I/O submission queue is stored in the memory of the NVMe controller 702; and store the at least one SQE in the target I/O submission queue based on the second address.

Optionally, the NVMe controller 702 is further configured to: determine an identifier of the target I/O submission queue based on the first PCIe address of the target I/O submission queue; and determine the second address based on the identifier of the target I/O submission queue.

Optionally, the NVMe controller 702 is further configured to calculate the identifier of the target I/O submission queue according to the following formula:

$$\text{the identifier of the target I/O submission queue} = \frac{ADD_{11} - ADD_{21}}{MCS \times 64}.$$

Herein, $ADD_{11}$ is the first PCIe address of the target I/O submission queue, $ADD_{21}$ is a start address that is of consecutive address spaces allocated from the addressable PCIe address space of the host and that is used to identify each I/O submission queue, and the MCS is a maximum quantity of coalesced SQEs in each I/O submission queue.

Optionally, the NVMe controller 702 is further configured to: before receiving the first PCIe packet of the host 701, receive a creation instruction of the host 701; set the at least one I/O submission queue in the second memory 704 of the NVMe controller 702 according to the creation instruction; and record an association relationship between an identifier of each I/O submission queue and information about an address of each I/O submission queue in the memory of the NVMe controller 702.

Optionally, the host 701 is configured to negotiate the maximum quantity of coalesced SQEs (MCS) in each I/O submission queue with the NVMe controller 702. The MCS obtained through negotiation is a smaller value of a maximum quantity of coalesced SQEs in each I/O submission queue supported by the NVMe controller 702 and a maximum quantity of coalesced SQEs in each I/O submission queue supported by the host 701.

Optionally, the first PCIe packet further includes depth information M of the target I/O submission queue, where M indicates a quantity of SQEs carried in the first PCIe packet, and where 1≤M≤MCS.

The NVMe controller 702 is further configured to: determine a preset sequence of M SQEs; and store the M SQEs in the target I/O submission queue in the preset sequence of the M SQEs.

Optionally, the first memory 703 in the host 701 is provided with at least one I/O completion queue.

The NVMe controller 702 is further configured to: obtain the at least one SQE from the target I/O submission queue; perform, based on the data operation request carried in the at least one SQE, a read or write operation on a storage medium managed by the NVMe controller 702; and send a second PCIe packet to the host 701. The second PCIe packet includes entrance information of a target I/O completion queue and at least one CQE, and one CQE corresponds to an operation result of one data operation request.

The host 701 is further configured to: receive the second PCIe packet sent by the NVMe controller 702; and store the at least one CQE in the target I/O completion queue based on the entrance information of the target I/O completion queue.

Optionally, the entrance information of the target I/O completion queue is a unique second PCIe address in the addressable PCIe address space of the host 701.

The host 701 is further configured to: determine a third address based on the second PCIe address, where the third address is an address at which the target I/O completion queue is stored in the memory of the host 701; and store the at least one CQE in the target I/O completion queue based on the third address.

Optionally, the host 701 is further configured to: determine an identifier of the target I/O completion queue based on the second PCIe address; and determine the third address based on the identifier of the target I/O completion queue.

Optionally, the host 701 is further configured to calculate the identifier of the target I/O completion queue according to the following formula:

$$\text{the identifier of the target I/O completion queue} = \frac{ADD_{12} - ADD_{22}}{MCC \times 64}.$$

Herein, $ADD_{12}$ is the second PCIe address of the target I/O completion queue, $ADD_{22}$ is a start address that is of consecutive address spaces allocated from the addressable PCIe address space of the host 701 and that is used to identify each I/O completion queue, and the MCC is a maximum quantity of coalesced CQEs in each I/O completion queue.

The host 701 is further configured to store the at least one CQE in the memory of the host 701 based on the identifier of the target I/O completion queue.

Optionally, the NVMe controller 702 is further configured such that when a CQE coalescing condition is met, the NVMe controller 702 uses operation results of at least two data operation requests as payload data of the second PCIe packet. One CQE corresponds to an operation result of one data operation request.

The CQE coalescing condition includes: a maximum coalesced CQE block (MCCB) size meets a third threshold, or a duration recorded by an I/O completion queue coalescing timer meets a fourth threshold.

Optionally, the second PCIe packet further includes depth information N of the target I/O completion queue, and N indicates a quantity of CQEs carried in the second PCIe packet.

The NVMe controller 702 is further configured to use N CQEs as the payload data of the second PCIe packet in a preset sequence, where 1≤N≤MCC, and where the MCC is a positive integer.

Optionally, the host 701 is an embedded processor, and the embedded processor can send a PCIe packet with a capacity of at least 64 bytes.

It should be understood that, in this embodiment of the present application, the host 701 may be a CPU, or the host 701 may be another general-purpose processor, a digital signal processor (DSP), an application-specific integrated circuit (ASIC), a field programmable gate array (FPGA) or another programmable logic device, a discrete gate or transistor logic device, a discrete hardware component, or the like. The general-purpose processor may be a microprocessor, any conventional processor, or the like.

The first memory 703 may include a read-only memory and a random-access memory, and may further include a nonvolatile random-access memory. The second memory 704 may include a read-only memory and a random-access memory, and may further include a nonvolatile random access memory.

In addition to a data bus, the bus 705 may further include a power bus, a control bus, a status signal bus, and the like. However, for clarity of description, various buses are marked as the bus 705 in the figure.

It should be understood that the storage system 700 according to this embodiment of the present application corresponds to the storage system 100 shown in FIG. 1 provided in the embodiment of the present application, and the storage system 700 is configured to implement corresponding procedures of the methods shown in FIG. 2 and FIG. 4. For brevity, details are not described herein again.

It should be understood that the storage system 700 for data processing according to this embodiment of the present application may correspond to the NVMe controller 500 and the host 600 for data processing in the embodiments of the present application, and may correspond to a corresponding entity that performs the method shown in FIG. 2 and the method shown in FIG. 3A, FIG. 3B, and FIG. 3C in the embodiments of the present application. In addition, the foregoing and other operations and/or functions of the modules in the storage system 700 are respectively intended to implement corresponding procedures of the method in FIG. 2 and the method in FIG. 3A, FIG. 3B, and FIG. 3C. For brevity, details are not described herein again.

All or some of the foregoing embodiments may be implemented through software, hardware, firmware, or any combination thereof. When the software is used to implement the embodiments, all or some of the embodiments may be implemented in a form of a computer program product. The computer program product includes one or more computer instructions. When the computer program instructions are loaded or executed on a computer, the procedures or functions according to the embodiments of the present application are all or partially generated. The computer may be a general-purpose computer, a special purpose computer, a computer network, or another programmable apparatus. The computer instructions may be stored in a computer readable storage medium or may be transmitted from a computer readable storage medium to another computer readable storage medium. For example, the computer instructions may be transmitted from a web site, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive (SSD).

A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on particular applications and design constraints of the technical solutions. A person skilled in the art may use different methods to implement the described functions for each particular application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

The foregoing descriptions are merely example implementations of the present application, but are not intended to limit the protection scope of the present application. Any variation or replacement can be readily figured out by a person skilled in the art according to the embodiments provided in the present application.

What is claimed is:

1. A data processing method implemented by a Non-Volatile Memory express (NVMe) controller, the data processing method comprising:
   communicating with a host using a network;
   receiving a first packet from the host, wherein a first memory in the NVMe controller is provided with at least one input/output (I/O) submission queue, and wherein the first packet comprises first entrance information of a target I/O submission queue and at least one submission queue entry (SQE);
   storing the at least one SQE in the target I/O submission queue based on the first entrance information of the target I/O submission queue; and
   sending a second packet to the host using operation results of at least two data operation requests as payload data of the second packet when a completion queue entry (CQE) coalescing condition is met,
   wherein a maximum number of the at least two data operation requests of the second packet is determined by negotiating a maximum quantity of coalesced CQEs (MCC) in each I/O complement queue (CQ) with the host, and wherein the MCC is a smaller value of a first MCC in each I/O CQ supported by the NVMe controller and a second MCC in each I/O CQ supported by the host.

2. The data processing method according to claim 1, wherein the first entrance information is a unique first address in an addressable address space of the host, and wherein storing the at least one SQE comprises:
  determining a second address based on the unique first address, wherein the second address is an address at which the target I/O submission queue is stored in the first memory of the NVMe controller; and
  storing the at least one SQE in the target I/O submission queue based on the second address.

3. The data processing method according to claim 2, wherein determining the second address based on the unique first address comprises:
  determining an identifier of the target I/O submission queue based on the unique first address of the target I/O submission queue; and
  determining the second address based on the identifier of the target I/O submission queue.

4. The data processing method according to claim 3, wherein determining the identifier of the target I/O submission queue comprises calculating, by the NVMe controller, the identifier of the target I/O submission queue according to a formula comprising:

the identifier of the target I/O submission queue = $\frac{ADD_{11} - ADD_{12}}{MCS \times 64}$, wherein $ADD_{11}$ is the unique first address of the target I/O submission queue, wherein $ADD_{12}$ is a start address that is of consecutive address spaces allocated from the addressable address space of the host and that is used to identify each I/O submission queue, and wherein MCS is a maximum quantity of coalesced SQEs in each I/O submission queue.

5. The data processing method according to claim 1, wherein before receiving the first packet from the host, the data processing method further comprises:
  receiving a creation instruction from the host;
  setting the at least one I/O submission queue in the first memory of the NVMe controller according to the creation instruction; and
  recording an association relationship between an identifier of each I/O submission queue and information about an address of each I/O submission queue in the first memory of the NVMe controller.

6. The data processing method according to claim 1, further comprising negotiating a maximum quantity of coalesced SQEs (MCS) in each I/O submission queue with the host, wherein the MCS is a smaller value of a first MCS in each I/O submission queue supported by the NVMe controller and a second MCS in each I/O submission queue supported by the host.

7. The data processing method according to claim 6, wherein the first packet further comprises depth information M of the target I/O submission queue, wherein M indicates a quantity of SQEs carried in the first packet, wherein $1 \leq M \leq MCS$, and wherein storing the at least one SQE in the target I/O submission queue comprises:
  determining a preset sequence of M SQEs; and
  storing the M SQEs in the target I/O submission queue using the preset sequence of the M SQEs.

8. The data processing method according to claim 1, wherein a second memory in the host is provided with at least one I/O completion queue, and wherein the data processing method further comprises:
  obtaining the at least one SQE from the target I/O submission queue;
  performing, based on a data operation request carried in the at least one SQE, a read or write operation on a storage medium managed by the NVMe controller; and
  sending the second packet to the host, wherein the second packet comprises second entrance information of a target I/O completion queue and a plurality of CQEs, and wherein one CQE corresponds to an operation result of one data operation request.

9. The data processing method according to claim 1, wherein the CQE coalescing condition is met when:
  a maximum coalesced CQE (MCC) block (MCCB) size meets a first threshold; or
  a duration recorded by an I/O completion queue coalescing timer meets a second threshold.

10. The data processing method according to claim 9, wherein the second packet comprises depth information N of a target I/O completion queue, wherein N indicates a quantity of CQEs carried in the second packet, wherein the data processing method further comprises using, by the NVMe controller, N CQEs as the payload data of the second packet in a preset sequence, wherein $1 \leq N \leq MCC$, and wherein the MCC is a positive integer.

11. A data processing method implemented by a host, the data processing method comprising:
  communicating with a Non-Volatile Memory express (NVMe) controller using a network;
  determining first entrance information of a target input/output (I/O) submission queue based on an identifier of the target I/O submission queue of a to-be-sent data operation request; and
  sending a first packet to the NVMe controller using at least two data operation requests as payload data of the first packet when a submission queue entry (SQE) coalescing condition is met,
  wherein the first packet comprises the first entrance information and at least one SQE, wherein a maximum number of the at least two data operation requests of the first packet is determined by negotiating a maximum quantity of coalesced SQEs (MCS) in each I/O submission queue (SQ) with the host, and wherein the MCS is a smaller value of a first maximum quantity of coalesced SQEs in each I/O SQ supported by the NVMe controller and a second maximum quantity of coalesced SQEs in each I/O SQ supported by the host.

12. The data processing method according to claim 11, further comprising allocating a unique first address in an addressable address space of the host to each I/O submission queue, wherein determining the first entrance information of the target I/O submission queue comprises:
  determining a first address of the target I/O submission queue based on the identifier of the target I/O submission queue; and
  using the first address of the target I/O submission queue as the first entrance information of the target I/O submission queue.

13. The data processing method according to claim 11, further comprising:
  sending a creation instruction to the NVMe controller, wherein the creation instruction instructs the NVMe controller to set at least one I/O submission queue in a memory of the NVMe controller; and
  recording an association relationship between an identifier of each I/O submission queue and a first address of each I/O submission queue.

14. The data processing method according to claim 11, further comprising negotiating the MCS in each I/O submission queue with the NVMe controller.

15. The data processing method according to claim 14, wherein the first packet further comprises depth information M of the target I/O submission queue, wherein M indicates a quantity of SQEs carried in the first packet, and wherein 1≤M≤MCS.

16. The data processing method according to claim 11, wherein the SQE coalescing condition is met when:
   a maximum coalesced SQE block (MCSB) size meets a first threshold; or
   a duration recorded by an I/O submission queue coalescing timer meets a second threshold.

17. The data processing method according to claim 11, further comprising:
   receiving a second packet from the NVMe controller, wherein the second packet comprises second entrance information of a target I/O completion queue and at least one completion queue entry (CQE); and
   storing the at least one CQE in the target I/O completion queue based on the second entrance information of the target I/O completion queue.

18. The data processing method according to claim 17, wherein the second entrance information is a unique second address in an addressable address space of the host, and wherein storing the at least one CQE in the target I/O completion queue comprises:
   determining a third address based on the unique second address, wherein the third address is an address at which the target I/O completion queue is stored in a memory of the host; and
   storing the at least one CQE in the target I/O completion queue based on the third address.

19. The data processing method according to claim 18, wherein determining the third address based on the second unique address comprises:
   determining an identifier of the target I/O completion queue based on the unique second address; and
   determining the third address based on the identifier of the target I/O completion queue.

20. The data processing method according to claim 19, wherein determining the identifier of the target I/O completion queue based on the unique second address comprises calculating the identifier of the target I/O completion queue according to a formula comprising:

$$\text{the identifier of the target I/O completion queue} = \frac{ADD_{21} - ADD_{22}}{MCC \times 64},$$

wherein $ADD_{21}$ is the second address of the target I/O completion queue, wherein $ADD_{22}$ is a start address that is of consecutive address spaces allocated from the addressable address space of the host and that is used to identify each I/O completion queue, and wherein MCC is a maximum quantity of coalesced CQEs in each I/O completion queue.

21. A Non-Volatile Memory express (NVMe) controller, wherein the NVMe controller comprises:
   a processor; and
   a first memory provided with at least one input/output (I/O) submission queue, wherein the processor is configured to:
      communicate with a host using a network;
      receive a first packet from the host, wherein the first packet comprises first entrance information of a target I/O submission queue and at least one submission queue entry (SQE);
      store the at least one SQE in the target I/O submission queue based on the first entrance information of the target I/O submission queue; and
      send a second packet to the host using operation results of at least two data operation requests as payload data of the second packet when a completion queue entry (CQE) coalescing condition is met,
   wherein a maximum number of the at least two data operation requests of the second packet is determined by negotiating a maximum quantity of coalesced CQEs (MCC) in each I/O complement queue (CQ) with the host, and wherein the MCC is a smaller value of a first MCC in each I/O CQ supported by the NVMe controller and a second MCC in each I/O CQ supported by the host.

22. A storage system comprising:
   a Non-Volatile Memory express (NVMe) controller; and
   a host configured to:
      communicate with the NVMe controller using a network;
      determine first entrance information of a target input/output (I/O) submission queue based on an identifier of the target I/O submission queue of a to-be-sent data operation request; and
      send a first packet to the NVMe controller using at least two data operation requests as payload data of the first packet when a submission queue entry (SQE) coalescing condition is met,
   wherein the NVMe controller is configured to:
      receive the first packet from the host, wherein the first packet comprises the first entrance information of the target I/O submission queue and at least one submission queue entry (SQE);
      store the at least one SQE in the target I/O submission queue based on the first entrance information of the target I/O submission queue; and
      send a second packet to the host using operation results of at least two data operation requests as payload data of the second packet when a completion queue entry (CQE) coalescing condition is met,
   wherein a maximum number of the at least two data operation requests of the second packet is determined by negotiating a maximum quantity of coalesced CQEs (MCC) in each I/O complement queue (CQ) with the host, and wherein the MCC is a smaller value of a first MCC in each I/O CQ supported by the NVMe controller and a second MCC in each I/O CQ supported by the host.

23. A Non-Volatile Memory express (NVMe) subsystem comprising:
   an NVMe controller; and
   at least one solid-state drive (SSD), wherein the NVMe controller is configured to:
      communicate with a host using a network;
      receive a first packet from the host, wherein the first packet comprises first entrance information of a target I/O submission queue and at least one submission queue entry (SQE);
      store the at least one SQE in the target I/O submission queue based on the first entrance information of the target I/O submission queue; and
      send a second packet to the host using operation results of at least two data operation requests as payload data of the second packet when a completion queue entry (CQE) coalescing condition is met,
   wherein a maximum number of the at least two data operation requests of the second packet is determined by negotiating a maximum quantity of coalesced CQEs (MCC) in each I/O complement queue (CQ) with the host, and wherein the MCC is a smaller value of a first MCC in each I/O CQ supported by the NVMe controller and a second MCC in each I/O CQ supported by the host.

* * * * *